United States Patent
Alonso

[11] Patent Number: 6,086,133
[45] Date of Patent: Jul. 11, 2000

[54] VEHICLE WINDOW SHADE ARRANGEMENT

[76] Inventor: Miguel Alonso, 1246 Neola St., Los Angeles, Calif. 90041

[21] Appl. No.: 09/055,459

[22] Filed: Apr. 6, 1998

[51] Int. Cl.[7] .................................................. B60J 3/00
[52] U.S. Cl. .................. 296/97.8; 296/141; 160/370.22; 160/23.1; 160/265
[58] Field of Search ................................... 296/138, 141, 296/143, 97.8; 160/66, 265, 310, 311, 370.22, 23.1

[56] References Cited

U.S. PATENT DOCUMENTS

| | | |
|---|---|---|
| D. 339,098 | 9/1993 | Cooper . |
| 928,864 | 7/1909 | Hoyt . |
| 2,547,373 | 4/1951 | Camp . |
| 3,156,294 | 11/1964 | Miller et al. . |
| 3,180,401 | 4/1965 | Gambon et al. .......... 160/265 |
| 3,183,033 | 5/1965 | Stulbach .................. 160/265 |
| 3,431,964 | 3/1969 | Rogers ..................... 160/23.1 |
| 3,460,602 | 8/1969 | Hugus ...................... 160/265 |
| 4,261,411 | 4/1981 | Dieterich . |
| 4,335,773 | 6/1982 | Masi . |
| 4,390,054 | 6/1983 | Niibori et al. ............ 160/265 |
| 4,494,256 | 1/1985 | Radtke et al. ............ 160/265 |
| 4,758,041 | 7/1988 | Labeur . |
| 4,762,358 | 8/1988 | Levosky et al. . |
| 4,869,542 | 9/1989 | Lin . |
| 4,874,026 | 10/1989 | Worrall .................... 160/23.1 |
| 4,898,224 | 2/1990 | Woodworth ............. 296/97.8 |
| 4,932,711 | 6/1990 | Goebel . |
| 4,979,775 | 12/1990 | Klose . |
| 5,042,866 | 8/1991 | Cody ........................ 296/141 |
| 5,067,546 | 11/1991 | Jeuffray et al. ........... 160/23.1 |
| 5,186,231 | 2/1993 | Lewis ....................... 160/265 |
| 5,201,810 | 4/1993 | Ojima et al. ............. 160/370.22 |
| 5,249,616 | 10/1993 | Yen .......................... 160/23.1 |
| 5,287,908 | 2/1994 | Hoffffmann et al. ..... 160/265 |
| 5,344,206 | 9/1994 | Middleton ............... 160/370.22 |
| 5,404,926 | 4/1995 | Ojima et al. ............. 160/370.22 |
| 5,443,923 | 8/1995 | Laniado et al. . |
| 5,515,898 | 5/1996 | Alcocer ................... 160/265 |
| 5,560,668 | 10/1996 | Li . |
| 5,575,524 | 11/1996 | Cronk . |
| 5,653,277 | 8/1997 | Kerner et al. ............ 296/97.8 |
| 5,791,721 | 8/1998 | Lin ........................... 296/97.8 |
| 5,810,065 | 9/1998 | Solari ....................... 160/265 |
| 5,860,466 | 1/1999 | Kao .......................... 160/23.1 |

FOREIGN PATENT DOCUMENTS

| | | | |
|---|---|---|---|
| 509600 | 2/1955 | Canada .................... 160/23.1 |
| H020158 | 1/1956 | Germany ................. 160/23.1 |
| WO 8500633 | 2/1985 | WIPO ...................... 160/265 |

*Primary Examiner*—Joseph D. Pape
*Assistant Examiner*—Kiran Patel
*Attorney, Agent, or Firm*—Don Finkelstein

[57] ABSTRACT

A vehicle window shade arrangement for at least partially shading the windshield of a vehicle, such as an automobile, having a dash with an upper surface and an elongated opening in the surface extending along the width of the windshield, the window shade arrangement comprising a shade rolled about a shade tube rotatably mounted below the upper surface of the dash; a shade extender-retractor for selectively unrolling the shade from the shade tube to an extended position at least partially shading the windshield, and rolling the shade about the shade tube to a retracted position not shading the windshield; and left and right elongated side supports disposed adjacent left and right sides, respectively, of the windshield. The shade is supported and concealed by the left and right side supports when not retracted. The shade extender-retractor may comprise a manual or powered drive arrangement for driving the shade to the extended and retracted positions. An automatic covering arrangement covers the elongated opening in the dash when the shade is retracted. The shade arrangement may be equally applied to vehicles other than automobiles and may be employed to shade end and/or side windows of such vehicles.

43 Claims, 11 Drawing Sheets

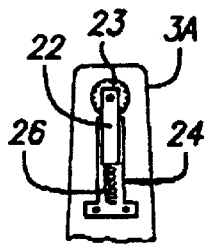
FIG. 6A
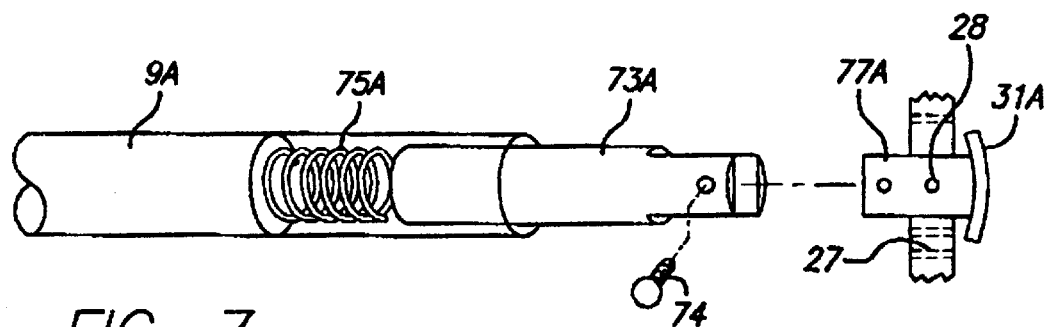
FIG. 7
FIG. 8
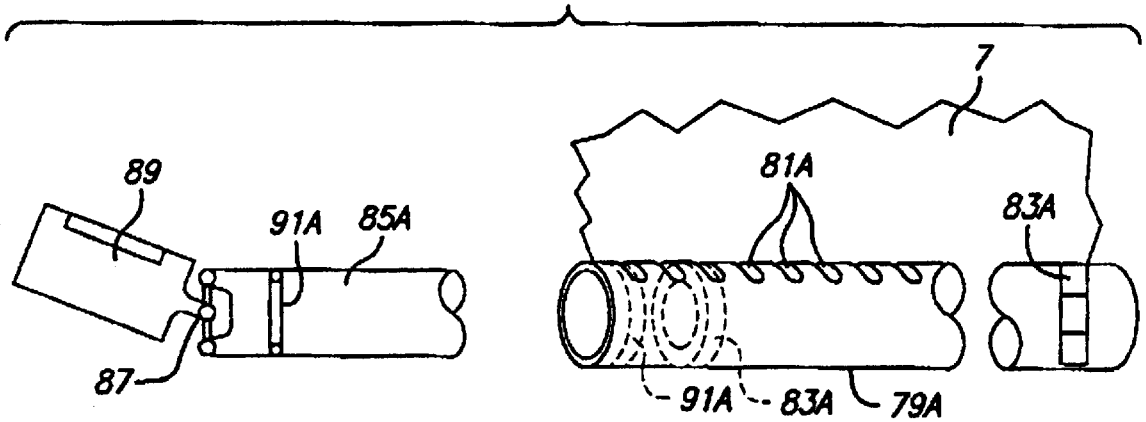
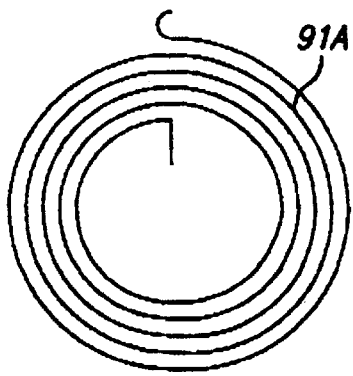
FIG. 8A
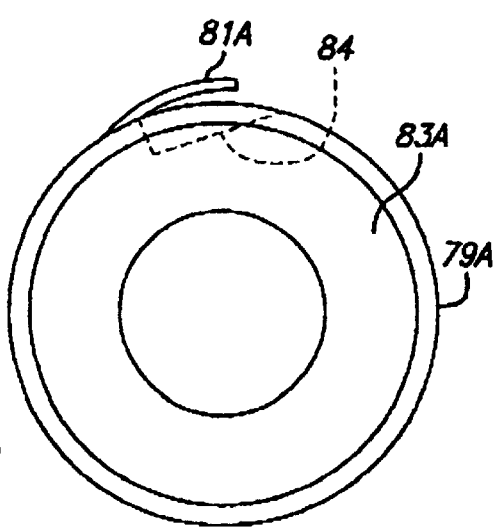
FIG. 8B

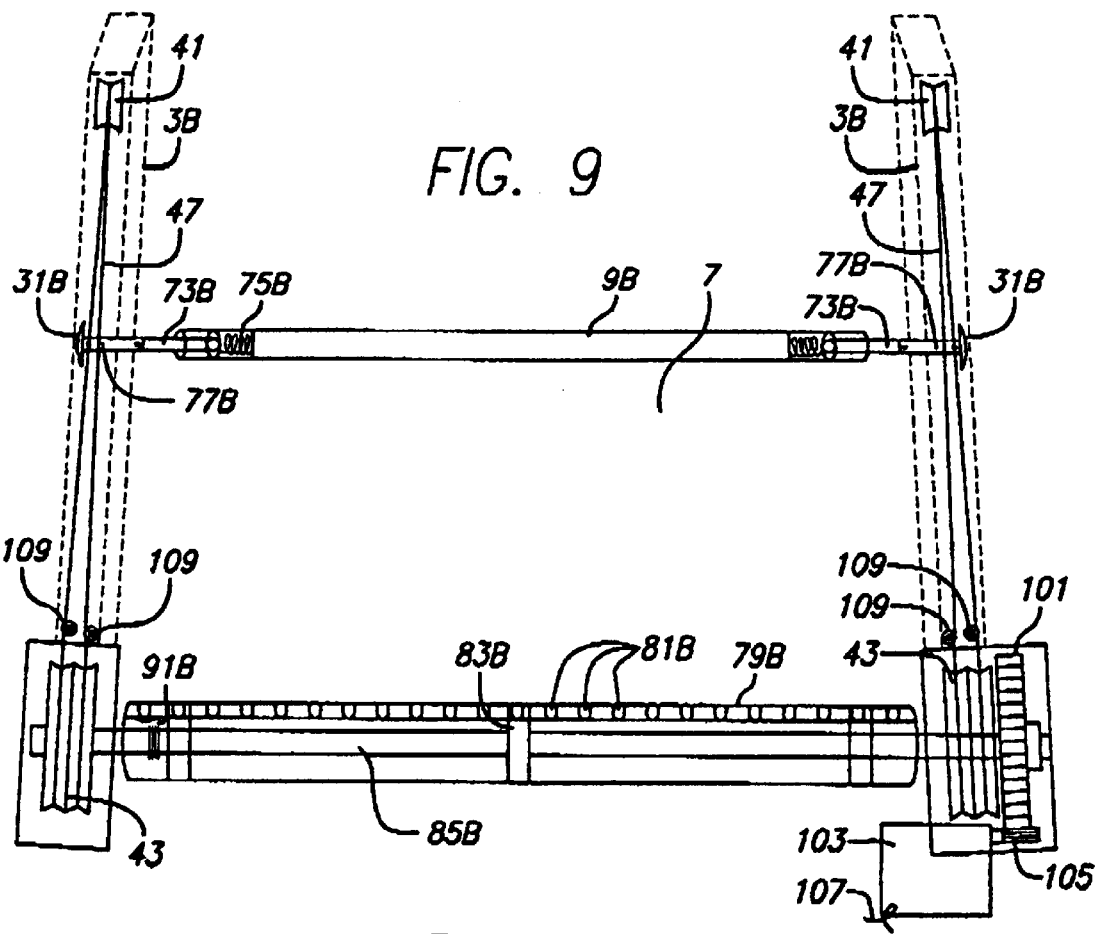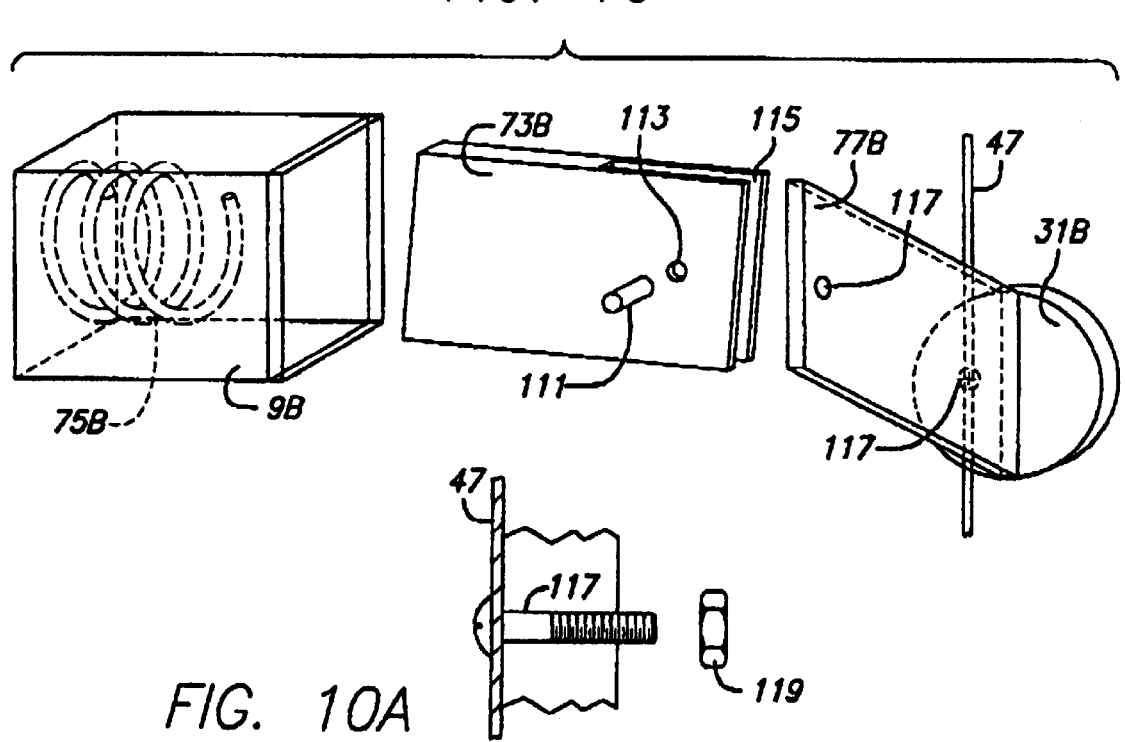

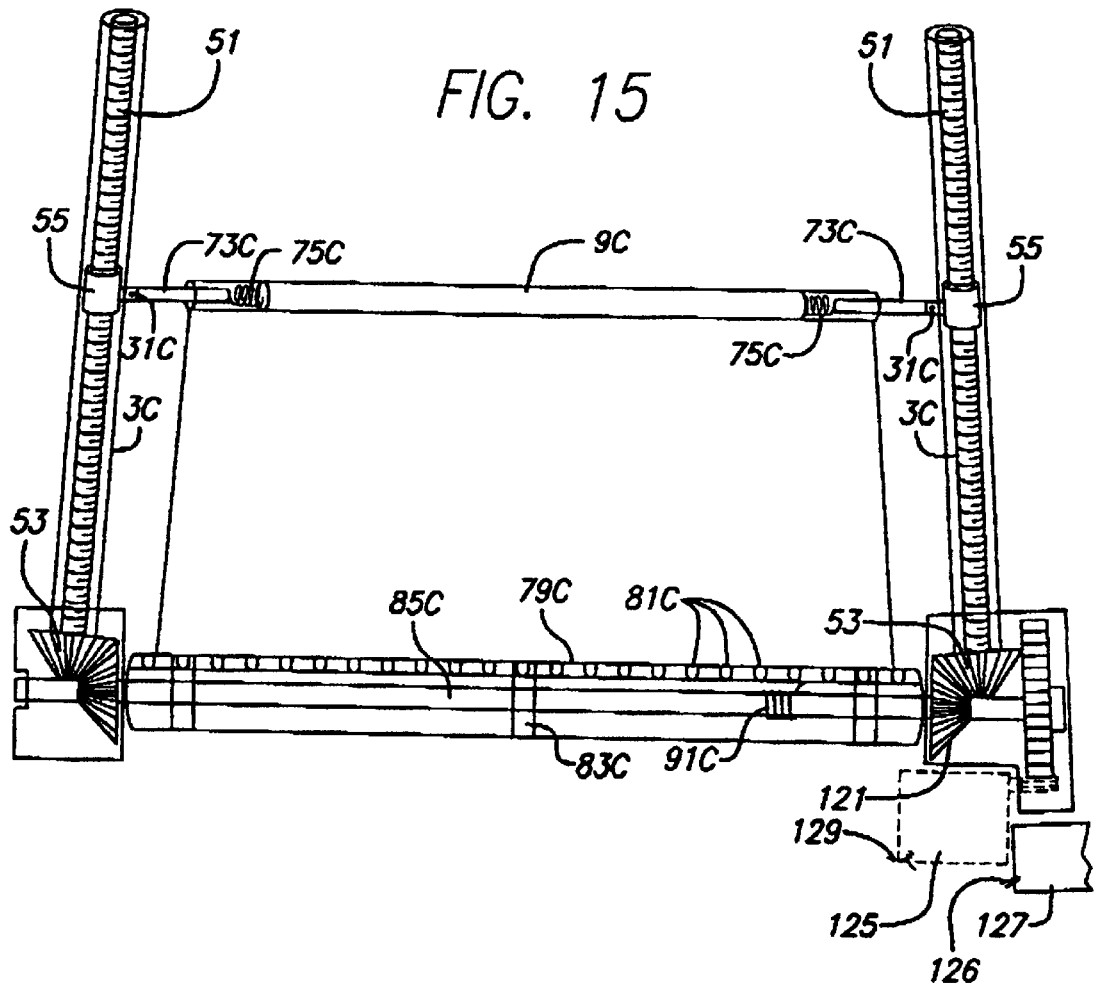
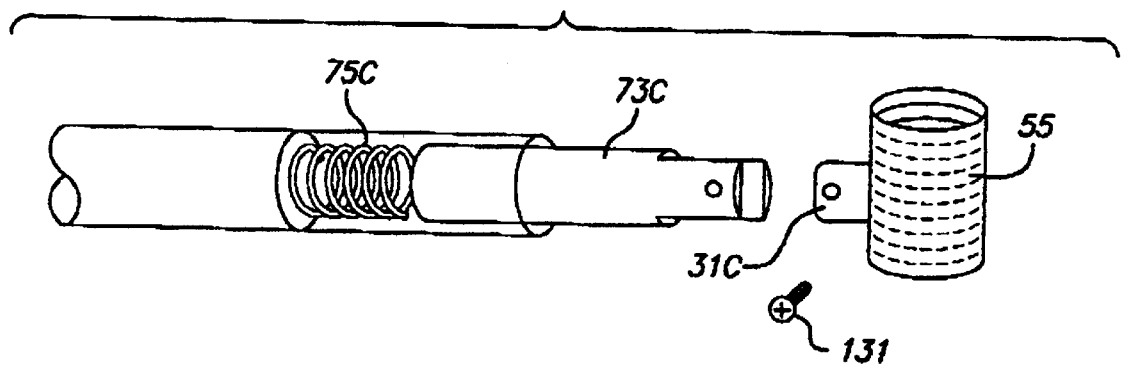

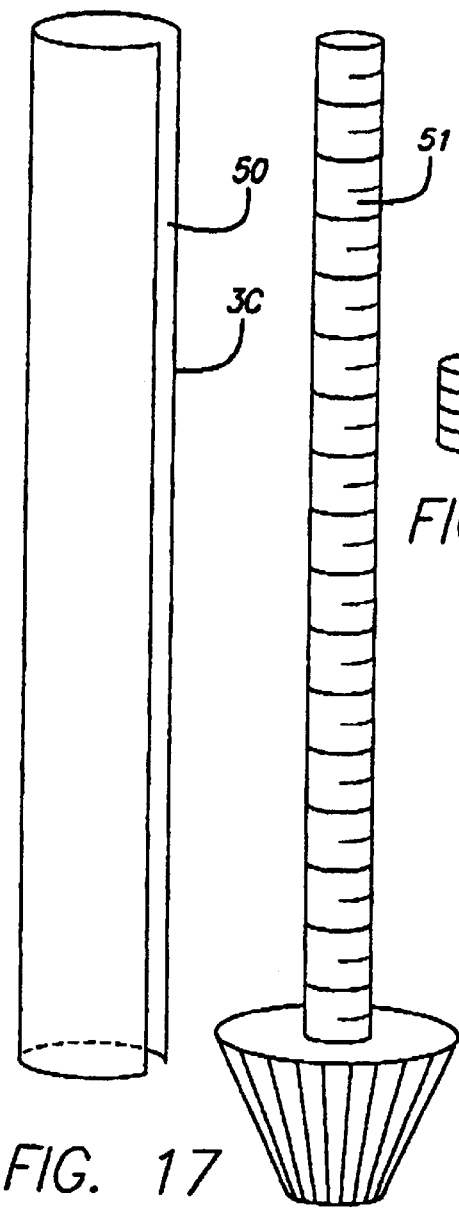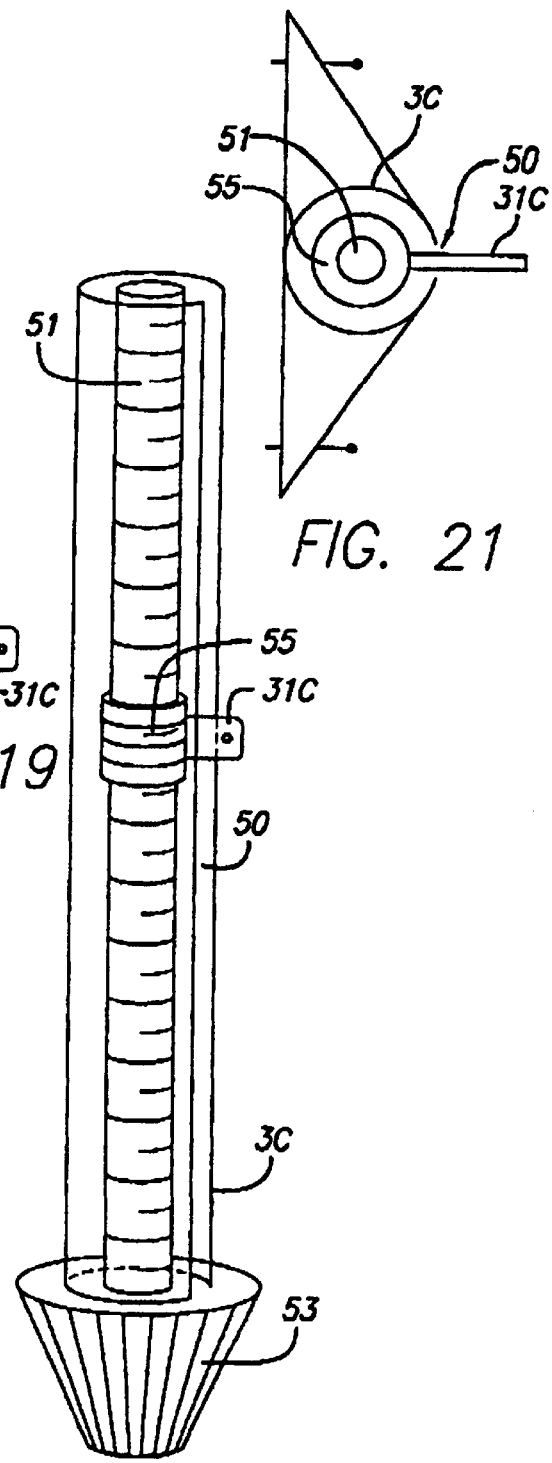
FIG. 17  FIG. 18  FIG. 19  FIG. 20  FIG. 21

VEHICLE WINDOW SHADE ARRANGEMENT

BACKGROUND OF THE INVENTION

1. Field of the Invention

This invention relates to the field of vehicle window shades, and in particular to an improved automobile windshield shade arrangement. The inventive concepts can equally apply to any vehicle windshield, rear window, and/or side window.

2. Brief Description of the Prior Art

Automobile sun shade arrangements are well known in the art. Such shades protect the interior of the automobile from damaging sun rays and block the view to the interior from the front of the automobile to discourage theft. A common, inexpensive, but unpopular shade comprises a portable foldable or collapsible cardboard or cloth device which must be manipulated, often with great difficulty, to a manageable size for storage. Even in the completely collapsed state, however, the size is generally too large to store in the glove compartment or other convenient and concealed location within the automobile.

Attempts to solve these problems have been offered but without success or acceptance by the purchasing public. Some examples of prior art efforts follow.

U.S. Pat. No. 5,575,524 to Cronk shows a simple arrangement in which a shade is wound onto a winding core, the wound shade being housed between a rigid window frame of the automobile and a cover. The cover has a slot in it through which the shade is manually pulled horizontally across the inside of the windshield and fastened at the opposite side of the windshield.

U.S. Pat. No. 5,560,668 to Li uses a vertically moveable shade, the roller for the shade being mounted horizontally along the top of the windshield on the inside of the automobile. A pair of gapped pipes disposed on left and right sides of the windshield receive sliders coupled to a horizontal moving rod to which the bottom of the shade is attached. Moving the movable rod up and down moves the sliders within the gapped pipes which serves to raise and lower the shade.

U.S. Pat. No. 5,443,923 to Laniado et al. is another sun shade adapted for attachment across a vehicle surface for protecting the interior of the vehicle against sun rays, the shade having a vertical roller. The shade is pulled off of the wound vertical roller to extend horizontally across the inside of the windshield and connect to the opposite side.

U.S. Pat. No. 5,404,926 to Ojima et al. teaches a roller shade having a spring-loaded retractor about which a sun shade is rolled. And a power drive unit is employed to raise and lower a horizontal rod to which the free end of the shade is attached, the power drive unit working against the spring force of the retractor. In one embodiment, the drive unit is placed below the center of the windshield, and a system of pulleys raises and lowers the shade, again from a shade retractor disposed along the lower edge of the windshield. In such a device, the stress on the shade increases as the shade is extended, leading to damage or unsightly wrinkling of the shade.

U.S. Pat. No. 4,979,775 to Klose discloses a window shade wrapped about a winding shaft at the top of the windshield. The free end of the shade is attached to an axially displaceable shaft, the shaft moving up and down to retract and extend the shade.

U.S. Pat. No. 4,932,711 to Goebel shows an automobile windshield shade having a tubular base attached to the dash of an automobile, and the bottom of an accordion pleated shade is attached to the base. A batten is used to hook the shade to the top of the windshield. Tension means at the base pulls the strings down to collapse the pleated fabric.

U.S. Pat. No. 4,869,542 to Lin is another example of a sun visor for an automobile in which a shade is rolled on a retractor at the base of the window, and the shade is manually pulled upwardly to hook at the top of the window in the extended position of the shade.

U.S. Pat. No. 4,762,358 teaches the use of a plurality of shade retractors mounted along the top of a windshield of an automobile and manually extendable to hook to a fastener on the bottom of the windshield.

U.S. Pat. No. 4,758,041 to Labeur shows a glare protection device for the rear window of a passenger car in which the shade is unrolled from a roll bar by means of a ball and screw arrangement. Rotating the screw in one direction raises the shade against the spring bias of the roll bar, and rotating the screw in the opposite direction lowers the ball and the shade coupled thereto.

U.S. Pat. No. 4,335,773 to Masi is another example of a sun curtain rolled on a retractor mounted at the bottom of a window and manually raised to hook on a fastener at the top of the window.

U.S. Pat. No. 4,261,411 to Dieterich is another example of a sun shade having a bottom roller or retractor about which a shade is rolled, the free end of the shade being manually connected to the top of the window. The sun shade of Dieterich is designed for the sloping rear windows of a hatchback car and has slots in it so that the person in the vehicle may have a degree of sun shade protection and yet have a view to the rear through the shade.

U.S. Pat. No. 3,183,033 to Stulbach shows yet another example of a shade retractor mounted at the bottom of a window of a vehicle and which is manually raised against the spring action of the retractor and hooked to the fasteners at the top of the window.

U.S. Pat. No. 3,156,294 to Miller et al. is directed to a spring-loaded hold-down device for keeping Venetian blinds from whipping around in the wind and banging against the window frame when the window is open.

U.S. Pat. No. 2,547,373 to Camp teaches a self-contained rising shade in which the rolled shade is disposed at the bottom of the automobile window, and the extended portion has a handle at its center which may be manually raised to be supported by a pair of resilient bands on each side of the shade member.

U.S. Pat. No. 928,864 to Hoyt discloses a spring-actuated shade having a weighted shade bar at the lower end adapted to frictionally engage the walls of guide ways, the shade bar being automatically returned to a horizontal position after being inadvertently tilted.

U.S. Pat. No. DES 339,098 to Cooper appears to be another version of an automobile sun shade which is wound on a roller at the bottom of the windshield and is manually extendible upwardly to be hooked to the top of the windshield.

With this prior art as background, it will be appreciated that improvements in the prior art devices are needed. In particular, all of the window shade arrangements which employ a spring-loaded retractor place the shade in tension, and as with the common window shade arrangement, this can cause unsightly bowing and wrinkling, since the rising bar is not necessarily always coupled to the sunshade precisely with the same tension at all points along the edge of the sun shade.

Additionally, although some of the prior art devices employ a casing with a gap through which the sun shade is pulled for extension, nevertheless, the retractor unit and other operating members of the assembly are visible and detract from the beauty of the interior of the automobile. The aforementioned patent to Cronk combines a window shading device and a rigid window frame of a motor vehicle windshield, but there is no attempt to cover the slotted opening in the winding core cover. Moreover, the pull tab at the free end of the shade must be always accessible, since the tab is to be manually pulled to the opposite side of the windshield for fastening.

The present invention avoids the aforementioned failings of the prior art, solves the problems associated with prior art devices, and provides other additional improvements over the basic vehicle sunshade arrangement.

SUMMARY OF THE INVENTION

There is thus a need in the art for an improved windshield shade arrangement which is easy and simple to operate, powered to both extend and retract the shade without deforming the shade or putting the shade in excessive tension, and which is essentially hidden from view when not in use. By coupling the sun shade to a pretensioned shade extender-retractor, the shade extension mechanism is desirably in tension at all positions of the shade, and yet the shade itself is not under tension.

In accordance with the invention, there is provided a windshield shade arrangement for shading the windshield of an automobile having a dash with an upper surface and an elongated opening in the dash surface extending along the width of the windshield, the windshield shade arrangement comprising a shade having a first end and an opposite second end, the shade extendable to shade the windshield and retractable for storage and concealment below the dash. A shade extender-retractor is coupled to the shade for selectively extending the shade to an extended position at least partially shading the windshield, and retracting the shade to a retracted position not shading the windshield.

In a further aspect of the invention, there is provided a windshield shade arrangement for at least partially shading the windshield of an automobile having a dash with an upper surface and an elongated opening in the surface extending along the width of the windshield. The window shade arrangement may comprise a shade rolled about a shade tube rotatably mounted below the upper surface of the dash out of sight. Left and right elongated side supports are disposed adjacent left and right sides, respectively, of the windshield, the shade being supported by the left and right side supports when not retracted. All of the mechanisms comprising the present invention are concealed in the retracted position of the shade, and only the shade and a member manipulating the free end of the shade are visible when the shade is in an extended position. As used in this specification, the term "free end" shall refer to the end of the shade opposite the end of the shade connected to the shade tube, i.e., the end of the shade being pulled, or otherwise moved, linearly. The "free end" may thus, in fact, be attached to a pulling or moving device or member.

In another aspect of the invention, there is provided a pretensioned shade extender for applying a constant tension on the shade independent of its position between fully extended and fully retracted.

In yet another aspect of the invention, there is provide a windshield shade arrangement for shading the windshield of an automobile having a dash with an upper surface and an elongated opening in the dash surface extending along the width of the windshield. The window shade arrangement comprises a shade tube rotatably mounted below the upper surface of the dash and a shade rolled about said shade tube, the shade having a connected end attached to the shade tube and an opposite free end. A shade extender-retractor is coupled to the shade free end for selectively unrolling said shade from the shade tube to an extended position at least partially shading the windshield, and rolling said shade about said shade tube to a retracted position not shading the windshield. An elongated cover is adapted to selectively cover and uncover the elongated opening in the dash surface, an automatic actuator is provided for manipulating the cover to cover the elongated opening when the windshield shade is at its retracted position and to automatically uncover the elongated opening when the windshield shade is at an extended position.

The shade extender-retractor of the present invention may comprise a manual or electro-mechanically powered drive arrangement for power driving the shade to the extended and retracted positions.

BRIEF DESCRIPTION OF THE DRAWING

These and other aspects of the invention will be better understood, and additional features of the invention will be described hereinafter having reference to the accompanying drawings in which:

FIG. 6A is a partial side view of the top of the windshield shade assembly shown in FIG. 6;

FIG. 7 is a partial cross sectional view of one end of a rising bar and the details of its connection with the extender-retractor arrangement of FIG. 2;

FIG. 8 is an exploded partial cross sectional view of one end section of a shade tube and the details of its connection with the shade and with the extender-retractor arrangement of FIG. 2;

FIG. 8A shows a retraction spring for winding a shade on the winding tube of FIG. 8;

FIG. 8B is an end view of a tube support mountable on a tube shaft of the extender-retractor arrangement of FIG. 2;

FIG. 9 is a partial cross sectional view of a complete windshield shade assembly employing the extender-retractor arrangement shown in FIG. 3;

FIG. 10 is a partial cross sectional view of one end section of a rising bar and the details of its connection with the extender-retractor arrangement of FIG. 3, the common axis being shown bent for illustrative purposes;

FIG. 10A shows the steel cord attachment fastener for the extender-retractor arrangement of FIG. 3.

FIG. 15 is a partial cross sectional view of the complete windshield shade assembly employing the extender-retractor arrangement shown in FIG. 4;

FIG. 16 is a partial cross sectional view of one end segment of a rising bar and the details of its connection with the extender-retractor arrangement of FIG. 4;

FIG. 17 is a perspective view of a guide tube of a side support structure of the extender-retractor arrangement of FIG. 4;

FIG. 18 shows a threaded shaft and gear member of the extender-retractor arrangement of FIG. 4;

FIG. 19 shows the nut guide for the extender-retractor arrangement of FIG. 4;

FIG. 20 shows the assembly of parts shown separately in FIGS. 17–19;

FIG. 21 is a top view of a side support for the extender-retractor arrangement of FIG. 4;

DETAILED DESCRIPTION OF THE PREFERRED EMBODIMENTS

Describing Elements of Construction and Functions in a Symmetrical Apparatus

Due to the symmetry of the extender-retractor arrangements about a front-to-rear center line of the automobile, it is often convenient to use the singular form of the elements being described. It will be understood that corresponding elements of the apparatus which would only be viewed from the opposite side perspective exist and have corresponding physical and mechanical features and functions. Occasionally, it is more reasonable to refer to symmetrical parts in a plural sense, such as mentioning side supports, even though the view being described may show only one such support. It will be understood, therefore, that where singular terminology is used for elements that obviously have mirror image counterparts, such singular terminology is used for convenience only.

For convenience of illustration and description, the invention is shown and described for use in an automobile. It will be understood that the window shade arrangement may be equally suited for shading the windows of any vehicle, including, but not limited to, trucks, tractors, and airplanes, or of any windowed enclosure requiring protection from sunlight entering the enclosure.

While the preferred end window embodiments of the invention are hereinafter primarily described and shown in the accompanying drawing as being installed on the windshield of a vehicle, it will be apparent that the same structure may be installed on the rear window of a vehicle for the same protection from sunlight entering the vehicle.

Description

Figure 1:
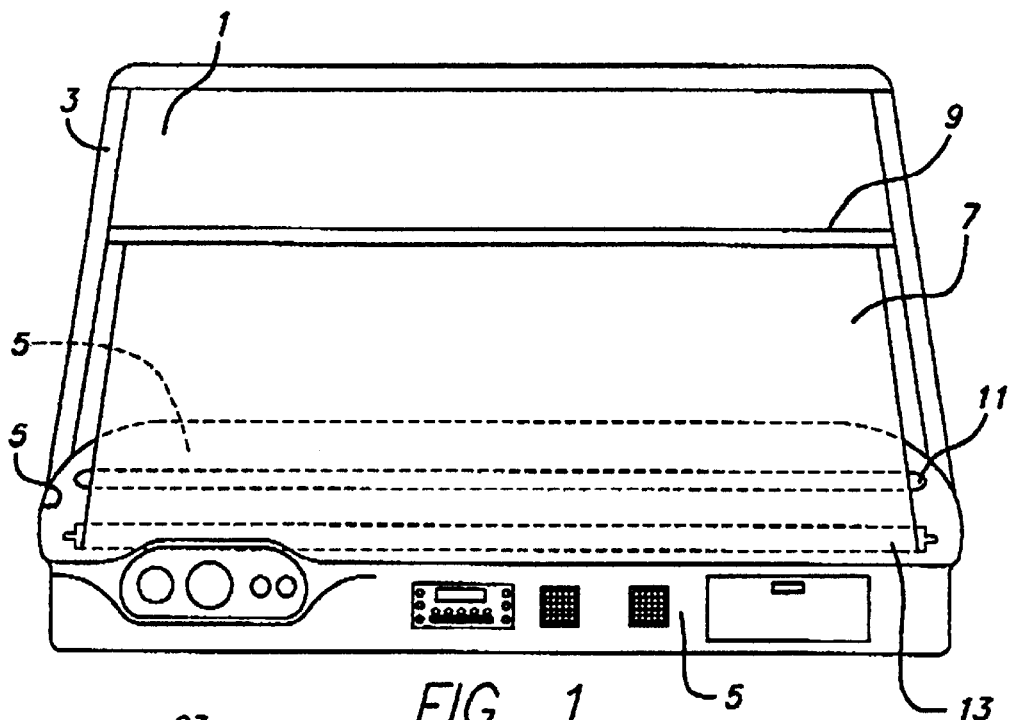
FIG. 1 shows the dash and windshield portion of an automobile employing the windshield shade arrangement according to the present invention, as viewed from inside the automobile.

FIG. 1 is a simplified drawing of an automobile windshield and dash arrangement as viewed from the inside of the automobile. A windshield 1 is shown having left and right elongated side supports 3. A dash 5 for the automobile has an elongated opening 11 in the horizontal surface thereof extending along the width of the windshield 1. A shade 7, supported at its top by a rising bar 9, passes down through the elongated opening 11 in the dash 5 and is rolled about a shade tube 13 rotatably mounted below the upper surface of the dash 5. The left and right ends of rising bar 9 are slidably coupled to the left and right elongated side supports 3 disposed adjacent left and ride sides of the windshield 1, respectively, the rising bar 9 for the shade 7 being supported by the left and right side supports 3 when not retracted.

The shade 7 is pretensioned between the rising bar 9 and the shade tube 13 by a mechanism to be described hereinafter at all positions of the shade 7 from fully retracted to fully extended. A moderate and constant amount of tensioning is purposely applied to the shade 7 extending between the rising bar 9 and the shade tube 13 so as to present a flat and stable shade, yet not distort the shape of the shade or cause it to wrinkle.

Figures 2, 3, 4:
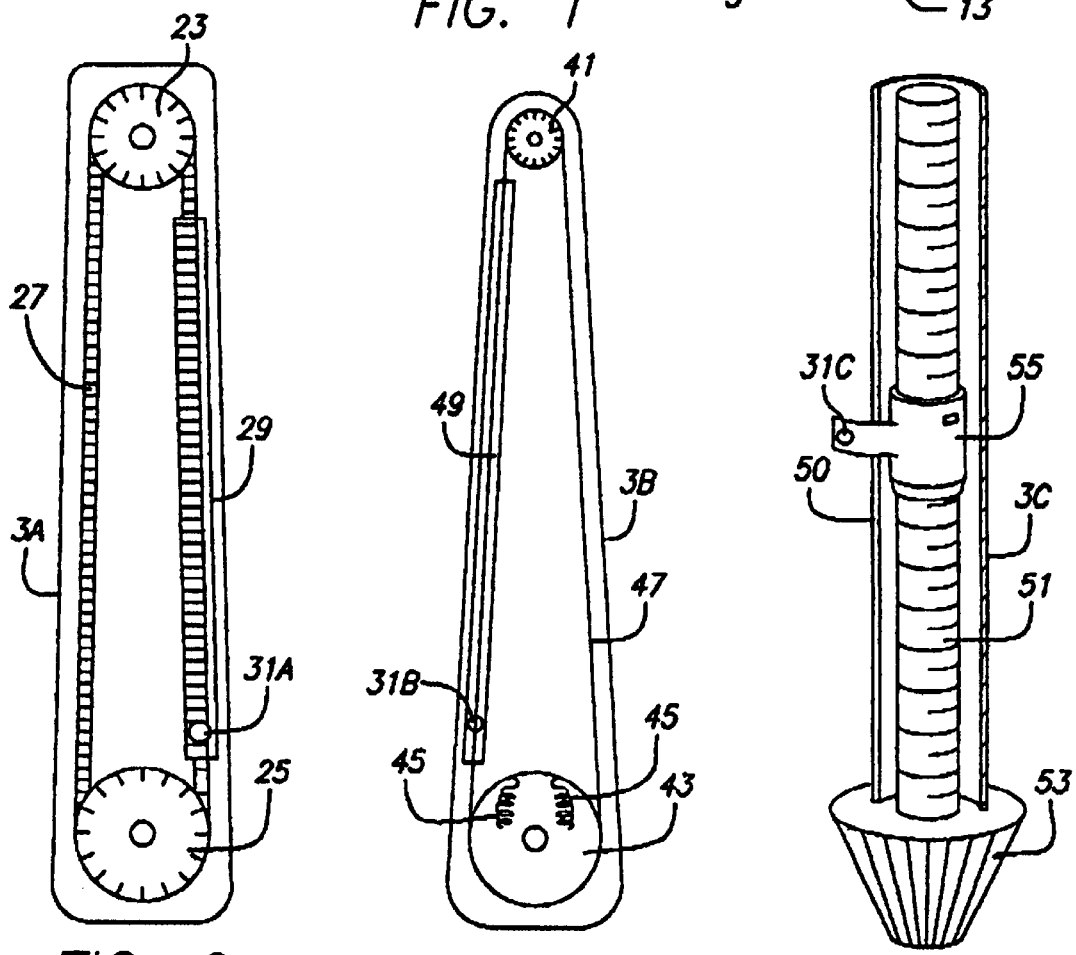
FIG. 2 is a left or right side elevational schematic representation of a first shade extender-retractor arrangement in accordance with the present invention.
FIG. 3 is a side elevational schematic representation of a second shade extender-retractor arrangement in accordance with the present invention.
FIG. 4 is a side elevational schematic representation of a third shade extender-retractor arrangement in accordance with the present invention.

FIGS. 2–4 show the basic concepts of three different shade extender-retractor embodiments, as the mechanisms would be viewed from one side (either side by design choice, i.e., FIG. 2 could be a left or a right side view) of the windshield 1. The arrangement of FIG. 2 uses a toothed (timing) belt spanning two pulleys, while FIG. 3 uses a tensioned steel (or other strong, flexible yet unstretchable material) cord wound about a set of pulleys, and the arrangement of FIG. 4 uses a threaded shaft and nut guide for moving the rising bar 9 up and down within the left and right elongated side supports 3. Each of these three embodiments will be described in detail.

In the FIG. 2 embodiment, a bearing-mounted upper pulley gear 23 and a bearing-mounted lower pulley gear 25 support a toothed belt 27 having teeth complimentary to teeth spaced about the periphery of the respective pulley gears 23 and 25. The meshing of the belt and pulley gear teeth ensure that the rising bar 9 will be properly indexed relative to the drive mechanism (to be described), i.e. the belt 27 is prevented from slipping relative to the pulley gears 23, 25, noting that the lower pulley gear 25 will be driven by a manual or electro-mechanical (motor and transmission) power source.

The pulley gears 23, 25 are mounted within the left and right elongated side supports 3A, and the rising bar connection 31A on each side is shown to be fixed at a specific position on the drive belt 27. Opening guide 29 in the side supports 3A permit the rising bar 9 to move substantially along the length of the side supports 3A.

In the FIG. 3 embodiment, similar to the arrangement shown in FIG. 2, a pair of pulleys 41, 43 are provided, around which is wound a length of steel cord 47 in tension about the pulley system by means of one or a pair of springs 45 within the casing of the bottom pulley 43. Each end of the steel cord 47 is wound about the lower pulley and then enters a cavity in the pulley 43 and fixed to one end of a spring 45, the other end of spring 45 being fixed to the body of the pulley 43 (directly or via a second spring 45). Thus, the steel cord 47 is in constant tension similar to the manner in which radio dial strings are wound.

FIG. 3 also shows the rising bar connection 31B fixed at a predetermined position along the length of the steel cord 47 within the longitudinal extent of the opening guides 49. The pulley system is mounted within the left and right elongated side supports 3B.

The third embodiment as shown in FIG. 4 for the shade extender-retractor is shown to comprise tubular left and right elongated side supports 3C having opening guides 50 formed therein for the projection of a rising bar connection tab 31C fixed to a nut guide 55. Nut guide 55 is threadably coupled to the threaded shaft 51 which is driven by a bevel gear 53 as will be described hereinafter. With a rotation of bevel gear 53, the threaded shaft 51, geared thereto, rotates moving the nut guide 55 up and down along the shaft 51 depending on the direction of rotation of bevel gear 53, thereby moving the rising bar 9 and shade 7 up and down as well.

Figure 5:
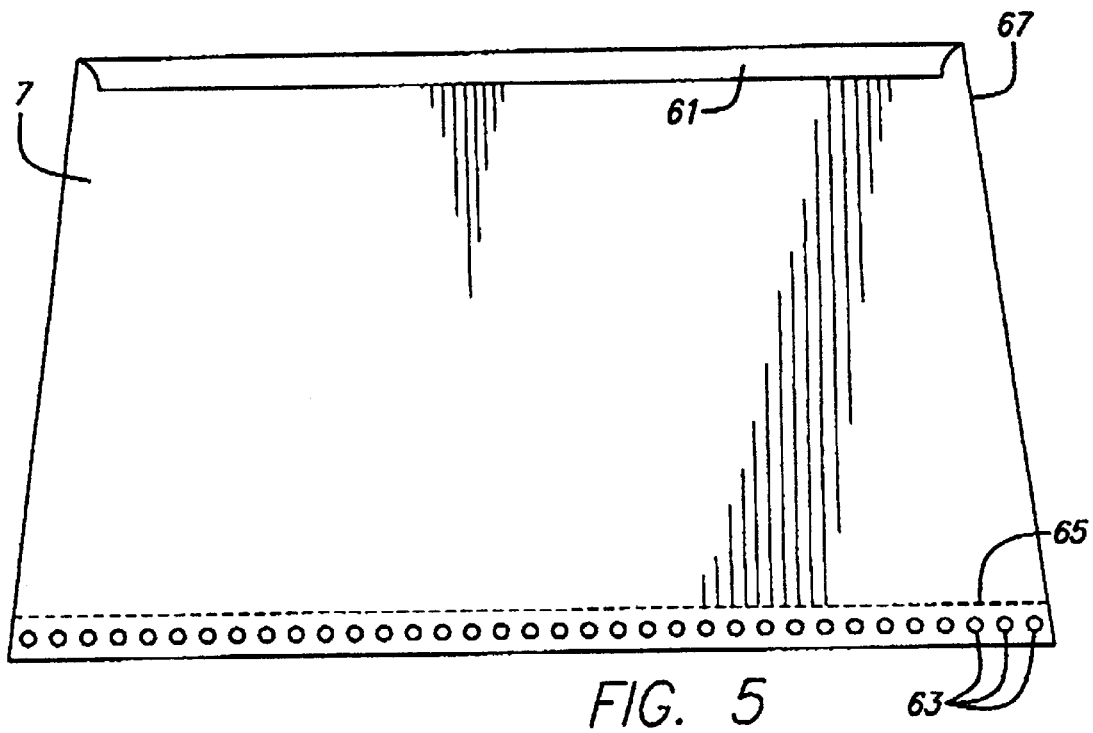
FIG. 5 is a front elevational view of a shade usable with any one of the extender-retractor arrangements of FIGS. 2–4.

FIG. 5 shows an example of a windshield shade 7 having a trapezoidal shape, i.e., having sloping sides 67 so as to fit nicely with the contour of the windshield of a modern automobile which typically tapers to a narrow width at the roof of the automobile. An inseam 61 is sewn at the top of the shade 7 for insertion of the rising bar 9. At the lower end of the shade 7, the shade material is folded over and sewn along line 65, and a series of holes, or eyelets 63, are punched/placed along the entire length of the bottom of the shade 7. These eyelets 63 will be engaged by a like plurality of hooks on the shade tube 13, as will be described.

Figure 6:
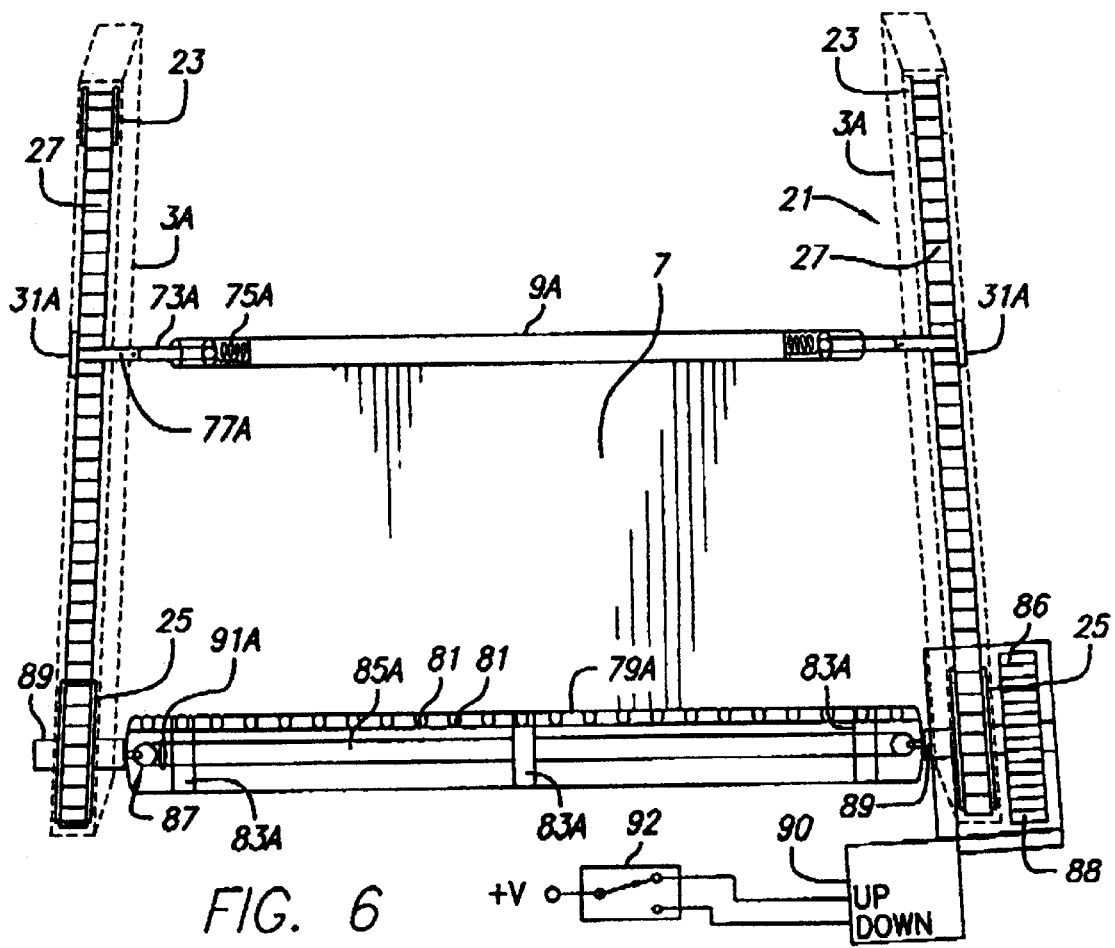
FIG. 6 is a partial cross-sectional view of the complete windshield shade assembly employing the extender-retractor arrangement shown in FIG. 2.

The first embodiment of the invention as briefly described in connection with FIG. 2 is shown in more detail in FIG. 6. Here, left and right elongated side supports 3 are tilted slightly inward toward each other at the top, indicating that the rising bar 9A must change its length as the shade 7 is extended and retracted.

With additional reference to FIG. 7, to accomplish this, rising bar 9A has a hollow end segment at each of its ends, within which a compression spring 75A presses against the proximal end of a plunger 73A. The distal end of the plunger 73A is pivotally attached to a short link 77A. As best seen in FIG. 7, the link 77A is pivotally coupled to the distal end of the plunger 73A by means of a pin 74. At the distal end of the link 77A, the rising bar sliding connection cap 31A is attached. The sliding connection caps 31A may, for example, be captured by, and slidable within, a "T" channel (not shown) formed in the left and right side supports 3A. The belt 27 is fastened to the rising bar short link 77A by means, for example, of a rivet or screw 28.

With this arrangement, as the rising bar 9A is moved up and down, by the driving of the belt 27, the compression springs 75A compress further as the rising bar 9A rises and expand as the rising bar 9A lowers, thereby keeping the end segments of the rising bar 9A in proper alignment relationship with respect to the sloping left and right elongated side supports 3A.

With reference to FIGS. 6, 8, 8A, and 8B, the shade tube arrangement will be described.

The bottom pulley gears 25 are each fixedly mounted on a shaft extension 89 on both sides of the shade tube 79A. A shaft 85A extends along the inside of the shade tube 79A, the latter being supported on the shaft 85A by a series of annular tube supports 83A. Since the pulley system in the left and right elongated side supports 3A are typically at an angle, universal joints 87 are provided between the extreme ends of the shaft 85A and the shaft extensions 89.

As best seen in FIG. 8B, the shade tube 79A is provided with a series of hooks 81A linearly aligned axially along the outer surface of the shade tube 79A, each hook 81A departing from the circular shape of shade tube 79A to form a somewhat tangential projection defining the hook 81A and over which the eyelets 63 (FIG. 5) on the bottom of the shade 7 are hooked. Shade tube 79A may optionally have a cutout 84 formed axially along the underside of the hooks 81A to facilitate assembly.

In order to pretension the shade 7 between the rising bar 9A and the shade tube 79A, a helical spring 91A is fitted in at least one end of the shade tube 79A, one end of the helical spring being connected to the shaft 85A, and the other end connected to the shade tube 79A which is rotatable about shaft 85A.

Importantly, the force applied by spring 91A is mild, just sufficient to put the shade 7 in slight tension so as to condition the shade into a flat configuration, and yet not over-tension the shade which would tend to wrinkle the shade or otherwise distort it or increase the chances for tearing or ripping of the shade, especially as it ages.

The drive shaft 85A may be manually turned by manually rotating main gear 86, or manually cranked (not shown) or, preferably, driven by a motor with transmission 90 having an output drive gear 88 meshing with the teeth of main gear 86.

In all embodiments of the invention, the motor is reversible in order to move the shade in both the extended and the retracted directions. Representative of a circuit that will accomplish this is shown in FIG. 6. A switch 92, preferably mounted conveniently on the dash of the automobile, receives battery power and routes it to the motor and transmission block 90 which turns the shaft of the motor in one direction when the switch is in its defined "up" position and reverses the direction when the switch is in its defined "down" position. Motor reversing switches and circuitry is old in the art and would be of common knowledge to one of ordinary skill in the art. Accordingly, no further details appear to be necessary or warranted.

Importantly, as the shaft 85A rotates under power to raise the shade 7, the rising bar 9A is moved upwardly by the belt 27, and at the same time, the shaft 85A rotates tending to unwind the shade 7 from the shade tube 79A. The diameter of the shade tube 79A is designed to be the same as the diameter of the bottom pulley gear 25. As a result, the pretensioning of the shade between the rising bar 9A and shade tube 79A by spring 91A remains relatively constant independent of the location of the rising bar 9A, i.e. the top of shade 7.

This is a main feature of all embodiments of the present invention which is not found in the prior art. That is, in the prior art the shade is rolled up on a shade tube which is spring loaded to roll the shade onto the shade tube when the shade is retracted. Thus, when the shade is pulled to unroll from the shade tube, the tension throughout the body of the shade continuously increases as the shade is extended and the return spring becomes tighter and tighter. As previously noted, this not only causes wear and early damage to the shade but also leaves the shade unsightly due to the extreme tension forces applied to the shade which varies from moderate when the shade is retracted to excessive when the shade is fully extended. As explained, the arrangement according to the present invention avoids this disadvantage by moving the rising bar and rotating the shade tube simultaneously, and this synchronized movement keeps the shade in relatively constant moderate tension (purposely applied) at all times and in all positions of the shade from fully retracted to fully extended.

In FIG. 6A, it will be observed that the top pulley gear 23 is mounted on a vertical shaft which is telescopically received in an outer tube 24 which has a compression spring 26 positioned between the bottom of the vertical shaft 22 and the base of the outer tubular portion 24 which is fixedly mounted to the side support 3A. With this arrangement, the upper pulley gear 23 keeps the belt 27 in tension and is self adjusting for belts of slightly different lengths and for aging of the belts which may stretch slightly as they get older.

The second embodiment of the invention as briefly described in connection with FIG. 3 is shown in more detail in FIGS. 9–14. The powered shade of this embodiment works with a steel cord 47, upper and lower pulleys 41, 43, and a pair of small alignment pulleys 109. The steel cord 47 is wrapped around lower pulley 43 in one direction and tied, i.e. fixed, to one side of the lower pulley 43 by a pin 48 (FIG. 13) or other known fastening means. The other end of the steel cord 47 is wrapped around pulley 43 in the opposite direction a number of times sufficient to permit the point 46 on steel cord 47 (at which the rising bar 9B is attached) to move from a fully retracted position to a fully extended position of the rising bar 9B the ends of which pass through the vertical guide opening 49 in the same manner as described in connection with FIGS. 2 and 6.

The bottom pulley 43 is, in effect, two pulleys physically attached to one another, i.e. a middle divisor 52 provides separate lined-up diameters for the steel cord 47 unwinding from one side of pulley 43 and winding onto the other side of pulley 43, and vice versa. The tension spring 45 may be attached to either side of the pulley and to either end of the steel cord 47, or to both ends of cord 47 (cf. FIG. 3).

Figure 11:
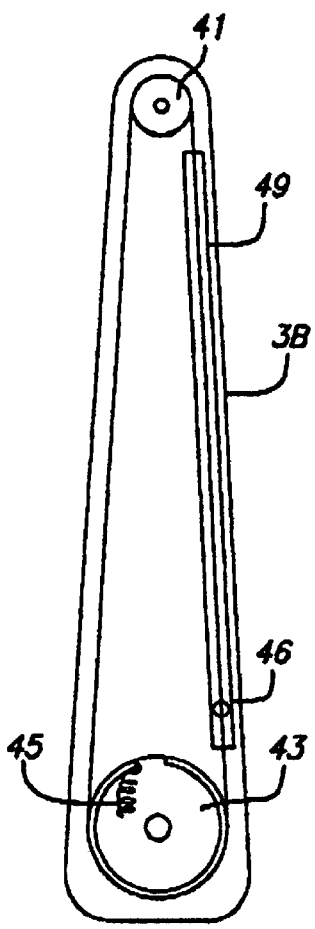
FIG. 11 shows the details of the steel cord and spring connection to the pulley system used with the extender-retractor arrangement of FIG. 3.
Figure 12:
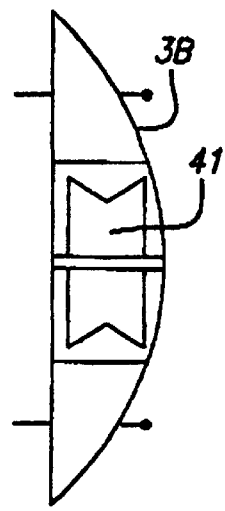
FIG. 12 is a top view of the left side support for the extender-retractor arrangement of FIG. 3.
Figure 13:
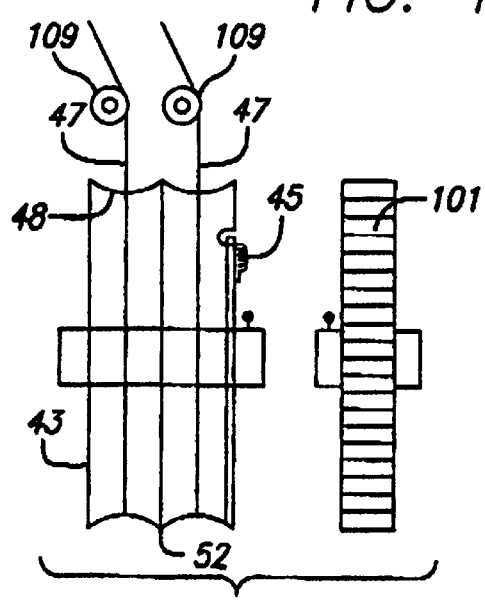
FIG. 13 shows the details of the pulley and main gear arrangement for the extender-retractor arrangement of FIG. 3.
Figure 14:
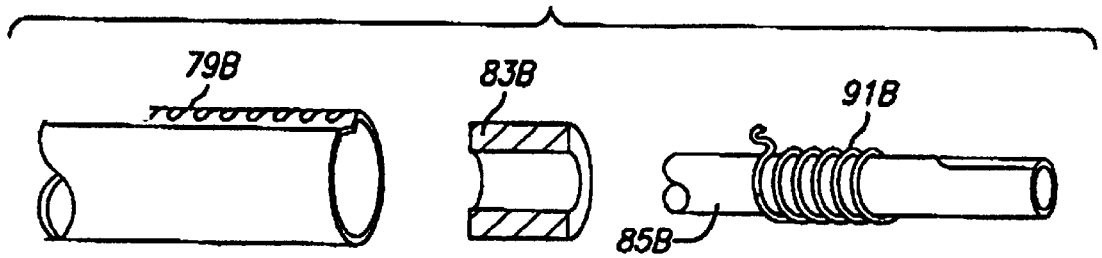
FIG. 14 is a partial cross sectional view of one end segment of a shade tube and the details of its connection with the shade and with the extender-retractor arrangement of FIG. 3.

FIG. 12 is a top view of the shade extender-retractor shown in FIG. 11, and FIG. 13 best shows the connection to pulley 43 of the ends of steel cord 47, as well as showing the positional relationship with respect to the main gear 101 which is driven by the transmission output gear 105 driven by motor and transmission box 103, the power to the motor being supplied by a power cable 107 (FIG. 9).

The shade tube 79B supported on drive shaft 85B by annular tube supports 83B operate the same as that described in connection with FIGS. 6, 8, 8A, and 8B, with one exception. The exception is that the arrangement of FIG. 9 does not require a shaft extension at the ends of shaft 85B and the associated universal joints. This is due to the fact that, with a flexible wire cord 47, the alignment pulleys 109 present the bottom pulleys 43 with aligned steel cords, while the arrangement of FIG. 6 required that the bottom pulleys be at an angle relative to the shaft of the shade tube 79A.

The helical pretension spring 91B serves the same function as that of helical spring 91A described in connection with FIGS. 6, 8, and 8A.

In the second embodiment of the invention, an alternative shape and fastening arrangement for the rising bar 9B is shown in FIG. 10. Here, a rectangular bar 9B is provided with a compression spring 75B against which the telescoping plunger 73B is pressed. As with the first embodiment, a rectangular link 77B (shown axially askew for illustrative purposes) is pivotally coupled to the split end of plunger 73B, the end of link 77B fitting into a slot 115 of the plunger 73B until a pin 111 is permitted to pass through hole 113 in the plunger 73B and hole 117 in the link 77B. The pin 111 is then secured in any known fashion. A rising bar sliding connection cap 31B is shown to be fixed at a specific position on the outer steel cord 47 by employing a bolt 117 and nut 119 which secures the steel cord 47 to the link 77B under the head of bolt 117.

Turning now to the third embodiment of the invention as briefly described in connection with FIG. 4, reference is made to the more detailed drawings of FIGS. 15–22.

In the third embodiment, the construction of the rising bar 9C is generally the same as the aforedescribed rising bars 9A and 9B. That is, the ends of the rising bar 9C are hollowed to form a telescopic relationship with a plunger 73C working against a compression spring 75C as best shown in FIG. 16. With this construction, the rising bar 9C is automatically permitted to become shorter at the top of the windshield and longer at the bottom of the windshield.

Similarly, the shade tube 79C is supported on a shaft 85C by annular tube supports 83C, the shade tube 79C having a number of shade hooks 81C.

In this third embodiment, the drive mechanism differs from that of embodiments 1 and 2 by the provision of a set of bevel gears, a threaded shaft, and a nut guide for each side of the windshield. The function of these elements will be described in connection with the accompanying FIGS. 15–22.

A bevel gear 121 fixed to the shaft 85C at each end thereof. The shade tube end gears 121 are driven by the shaft 85C under power applied to main gear 123 which, in turn, is driven by a motor and transmission having an output drive gear 124. FIG. 15 shows schematically two alternative positions for the motor and transmission. In the solid lines, the motor and transmission 127, receiving electrical power from power cable 126, is shown with the output drive gear 124 directly in-line with the pulley gear 123. The dashed lines for the alternate motor and transmission 125 show a transverse shaft output with the output drive gear 124 meshing with the pulley gear 123. The motor and transmission 125 is powered by a power cable 129.

The meshing bevel gear 53 for each side support 3C is driven by the respective shade tube end gear 121 as best seen in FIG. 15. The translation of drive direction effected by the meshing of gear pairs 53, 129 is not at 90 degrees, in order to accommodate the sloping left and right elongated side supports 3C. By this arrangement, the shaft 85C in this third embodiment need not have any shaft extension or universal joint as was described in connection with the first embodiment.

As the driven bevel gear 53 rotates, a threaded shaft 51, fixed to gear 53, also rotates within the left and right side supports 3C. An internally threaded nut guide 55 is translated vertically by the rotation of threaded shaft 51, the vertical direction being reversible by reversing the direction of rotation of gear 53 under control of the motor and transmission 125 or 127.

The nut guide 55 has a tab 31C projecting through an opening 50 in the tube guide, side supports, 3C for attachment of the rising bar 9C and for preventing nut guide 55 from rotating. The rising bar 9C with the top of the shade 7 attached thereto is attached to the tab 31C by means of a hole provided in tab 31C by any known fastening means. In the example shown in FIG. 16, a pin or screw 131 fixes the tab 31C to the end of plunger 73C through aligned openings provided in the respective parts. The tab 31C is thus permitted to slide up and down from a fully retracted to a fully extended position for the shade through the opening 50. Elongated opening 50 permits the guide nut 55 to translate axially along threaded shaft 51 while preventing guide nut 55 from rotating.

Three separate drive mechanisms have been described for raising and lowering the shade 7 by rolling or unrolling shade 7 onto or off of a shade tube 79A-C. In the preferred embodiment, when the shade is fully retracted, the elongated opening 11 in the dash 5 (FIG. 1) would be exposed. Aesthetically, it would be desired to have the elongated opening 11 covered when the shade 7 is fully retracted. Additionally, if the opening 11 is not covered, small articles, such as coins, pencils, etc. may fall into the slot 11 damaging the windshield shade mechanism or jamming it. In order to provide an elongated cover for the elongated opening 11, an arrangement similar to that shown in FIG. 23 will automatically open and close according to the mode of use, and in particular will hide the power shade when not in use.

Figure 23:
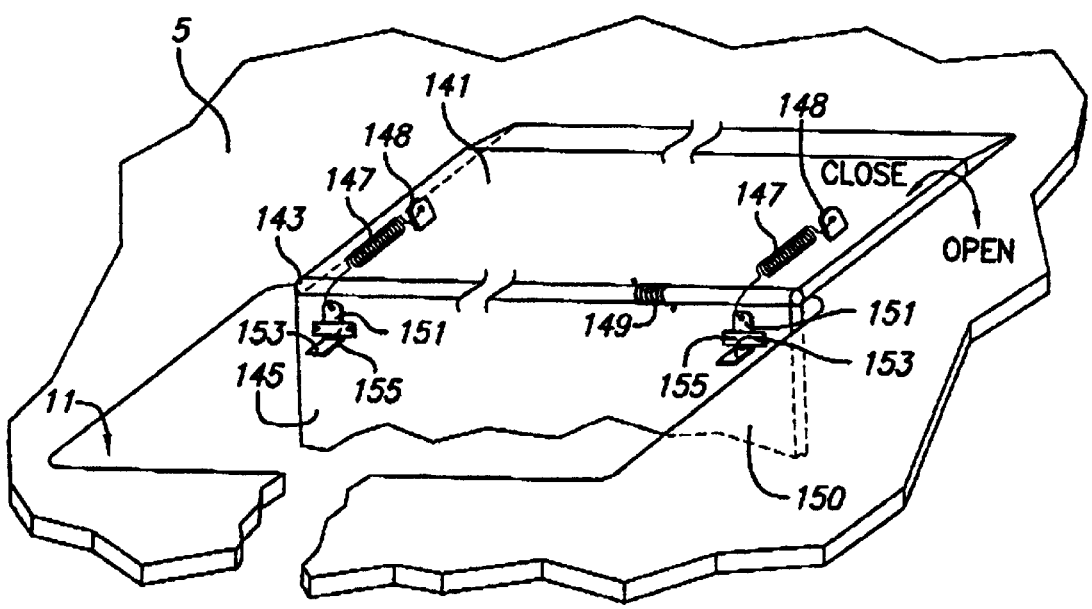
FIG. 23 shows schematically the details of a covering assembly for covering the slot in an automobile dashboard when the windshield shade is fully retracted.

A cover 141, shown in the open position in FIG. 23 is hinged forward, i.e. toward the windshield and away from the elongated opening 11 in the dash 5. In this condition, the shade 11 is in use, and the rising bar 9A-C (not shown in FIG. 23) is likewise located at a position above the dash 5. The cover 141 is hinged and biased to the open, or uncovered, position about hinge 143 by a helical spring 149, one end of which is connected to a vertical support plate 150 attached to the underside of the dash by any known fastening means. The other end of spring 149 is fixed to the cover 141, and the pretension on spring 149 is designed to force the cover 141 open.

The closing mechanism is shown to be identical on both sides of the cover 141 and comprises a right angle bracket 151 having a horizontally projecting foot 153. The bracket 151 is moveable vertically within a strap 155 fixed to the vertical plate 150. That is, bracket 151 is permitted to slide up and down within strap 155 to a limited extent. A spring 147 having one end hooked into the top of bracket 151 and the other end hooked into a tab 148 on the cover 141 pull the bracket 151 upwardly until the foot 153 engages the bottom of strap 155. The combined tension strength of both springs 147 is insufficient to overcome the biasing force of spring 149 to hinge the cover 141 to the open position.

However, when the rising bar 9A-C is powered downwardly to the fully retracted position, the extreme left and right ends of the rising bar 9A-C engage the top surfaces of feet 153 and push the brackets 151 downwardly. This downward motion pulls the connected ends of springs 147 downwardly, and at a predetermined vertical position of the brackets 151, the combined tensions of the parallel-acting springs 147 overcome the strength of the helical spring 149 and pull the cover 141 downwardly until the free end of cover 141 contacts the upper surface of dash 5 and is preferably flush with the top surface of the dash.

When the shade is needed again, the operator, either manually or by energizing a motor and transmission device, causes the rising bar 9A-C to again rise from beneath the dash top surface, and as it rises and before contacting the underside of the closed cover 141, springs 147 draw brackets 151 upwardly as the feet 153 follow the rise of the rising bar 9A-C. At the aforementioned predetermined position of the rising bar 9A-C, the tension springs 147 are relaxed to a point at which the helical spring 149 is effective to cause the cover 141 to again raise to the open position.

The shade 7 can be replaceable when worn out. The outside may be coated with a silver sun-repellent material, while the inside surface of the shade 7 can be the matching color of the vehicle interior. The outer layer of the shade 7 may be personalized according to the car owner and/or vehicle manufacturer. For example, it may have the Chevrolet, Ford, or Chrysler logo imprinted on it.

Figure 24:
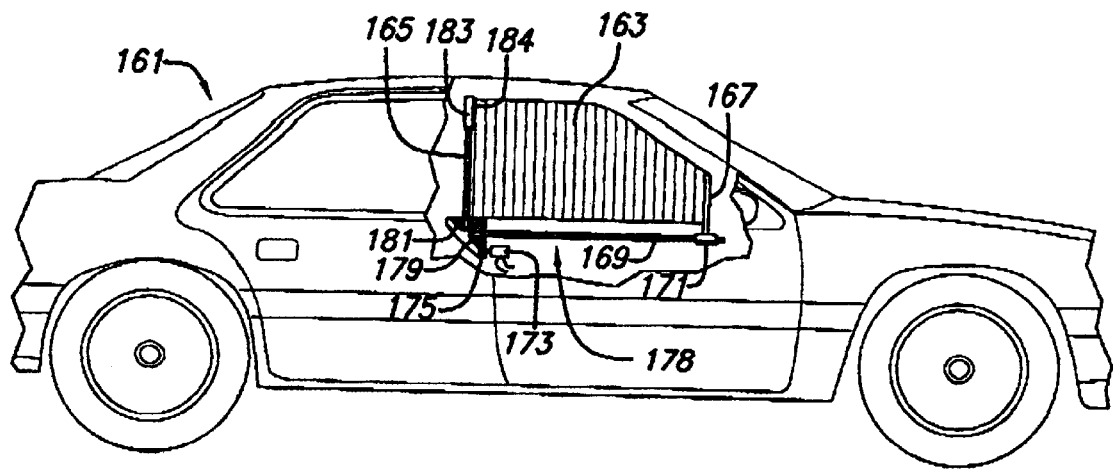
FIG. 24 shows a side cutaway view of an automobile side window shade arrangement installed in an automobile and employing the concepts of the present invention.
Figure 25:
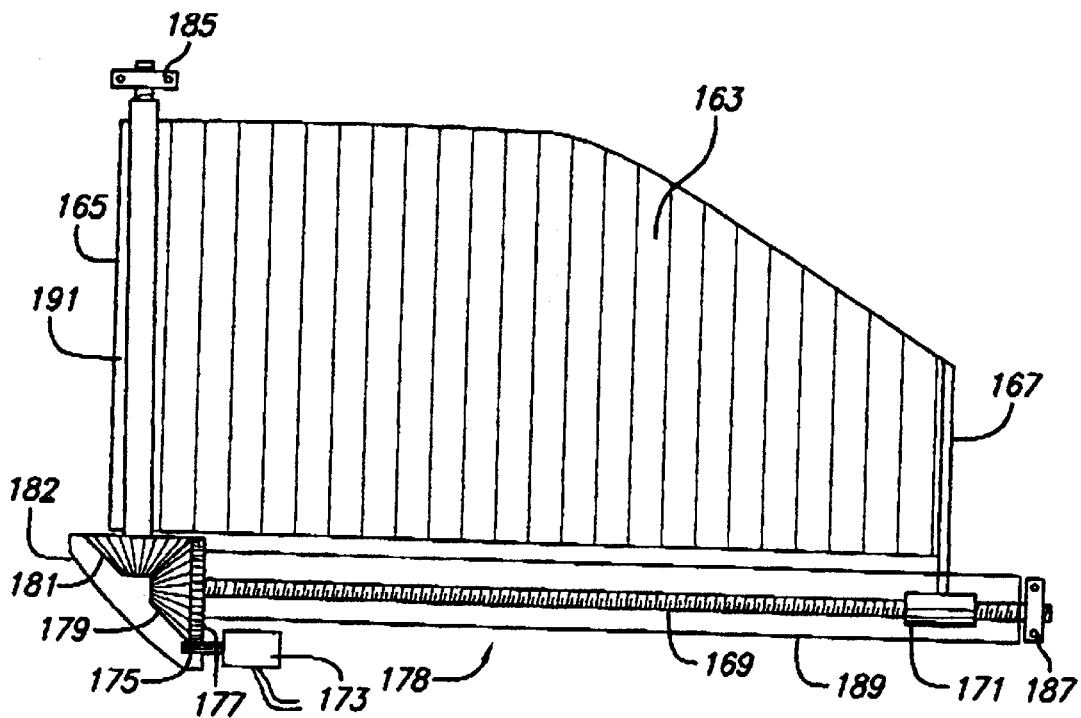
FIG. 25 is a more detailed view of the automobile side window shade arrangement shown in FIG. 24.

FIGS. 24–27 show a variation of the present invention in which the concepts heretofore described and shown in the accompanying drawing for use with an end window, i.e. windshield 1 (FIG. 1) or rear window 161A (FIG. 24), of a vehicle, may be applied to the side windows of the vehicle. In this description, the end window and associated generally horizontal surface beneath may thus refer to the vehicle's front windshield 1 and dash 5 (FIG. 1) or to the rear window 161A and rear deck 161B (FIG. 24). In FIG. 24, the front right passenger window of an automobile is shown shaded. However, the apparatus to be described herein for side window shading would equally apply to the driver side front window, as well as to the passenger and driver side rear windows, simply by designing the mechanisms in a reverse and/or mirror image configuration. In FIG. 24, for example, the window shade 163 is rolled up on and dispensed from a vertically oriented roller or shade tube 165 at the rear of the right side front window. If used on the rear right side window (not shown), the shade tube 165 would be positioned at the front of the rear right side window.

The preferred mechanism for extending and retracting the shade 163 is basically a variation of the same mechanism illustrated in FIGS. 4 and 15–22. The major difference is that, in a side window embodiment, the shade tube is oriented vertically instead of horizontally, and only one horizontally oriented extender-retractor 178 is required. The extender-retractor 178 may be replaced, if desired, with the extender-retractor arrangements according to FIGS. 2 or 3, although the variation shown in FIGS. 4 and 15–22 is preferred.

A vertical frame member 183 is part of the mechanical construction of an automobile 161, providing support for the roof of the vehicle 161 and is the structural member within which the edge of a side window (not shown) slides up and down. The same vertical frame member 183 may also house the shade tube 165. For cosmetic purposes, and for keeping debris out of the vertical frame member 183, a soft, smooth rubber or felt strip 184 is located along a longitudinal side slot (not shown) in the frame member 183. The rubber or felt strip 184 is similar in appearance and function to that already in the window framework of an automobile, as is commonly known.

Figure 22:
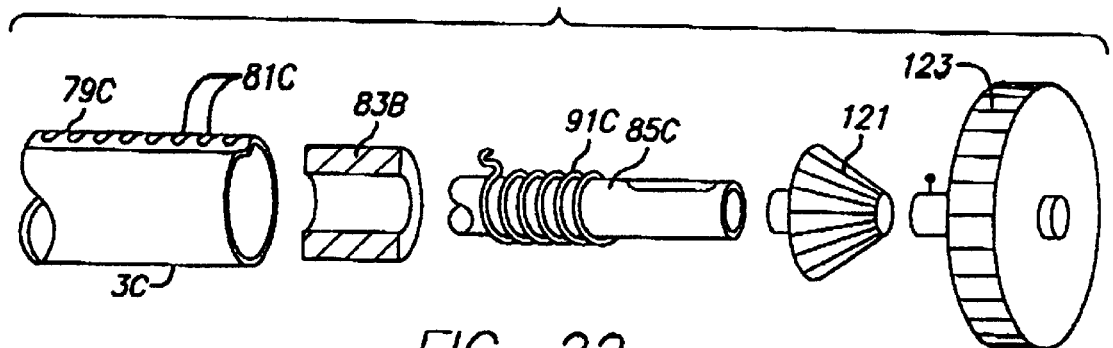
FIG. 22 is a partial cross sectional view of one end section of a shade tube and the details of its connection with the shade and with the extender-retractor arrangement of FIG. 4.

Within the door structure of the automobile 161, is a gear housing 182 (FIGS. 25 and 26), housing a pair of miter gears 179, 181, the former driving, or rotating, a screw or threaded shaft 169, and the latter driving, or rotating, a shaft 191 to which a shade tube 165 is attached by means of tube supports 193 (cf. FIG. 22 and associated description).

A top shaft bearing 185, and a right screw bearing 187 rotatably support the shaft 191 and screw 169, respectively, at their free ends. A lower shaft bearing 195 and a left screw bearing 197 may be provided adjacent the miter gears 181 and 179, respectively, to permit smooth rotation of the shaft 191 and screw 169.

A motor 173, which may be energized by any of a number of possible electrical switching arrangements, provides the power for rotating shaft 191 and screw 169 in either rotational direction. A motor shaft gear 175 is driven directly by the motor 173 which, in turn, rotates a screw drive gear 177 which meshes with the motor shaft gear 175. Rotation of miter gear 179, fixed to screw drive gear 177, rotates miter gear 181 and the attached shaft 191 and shade tube 165, in a manner hereinbefore described in connection with FIG. 15.

Motor 173 may be rotated in either direction, such that shaft 191 and screw 169 also may be selectively rotated in either angular direction. The mechanisms for providing pretension will not be shown or described in connection with FIGS. 24–27, as they have been adequately described and shown in FIGS. 15–22, and reference to such description and drawing may be made for details.

In order to keep the shade 163 relatively rigid in the vertical direction, it may be constructed by a series of horizontally arranged battens or stiffeners 164. The long side of the shade 163 is provided with a rigid side support 213 along which are formed a plurality of spaced eyelets 214. The eyelets 214 engage a like number of mating hooks 166 on the shade tube 165.

At the short side of the shade 163, a rigid shade end support strip 203 is attached, also having a series of spaced eyelets 205 provided therein. The end support strip 203 is brought into alignment with a pulling blade or bar 167 which has a corresponding number of holes 168 aligned with eyelets 205. Similarly, an elongated bracket 207 with spaced threaded holes 209 is provided for clamping the shade end support strip 203 between pulling blade or bar 167 and bracket 207, after which a number of screws 211 secure the strip 203 in place. Instead of screws 211 and threaded holes 209, rivets and through holes in the bracket 207 may be employed, or alternatively, a strong adhesive may be applied to attach strip 203 to pulling blade or bar 167.

Figure 26:
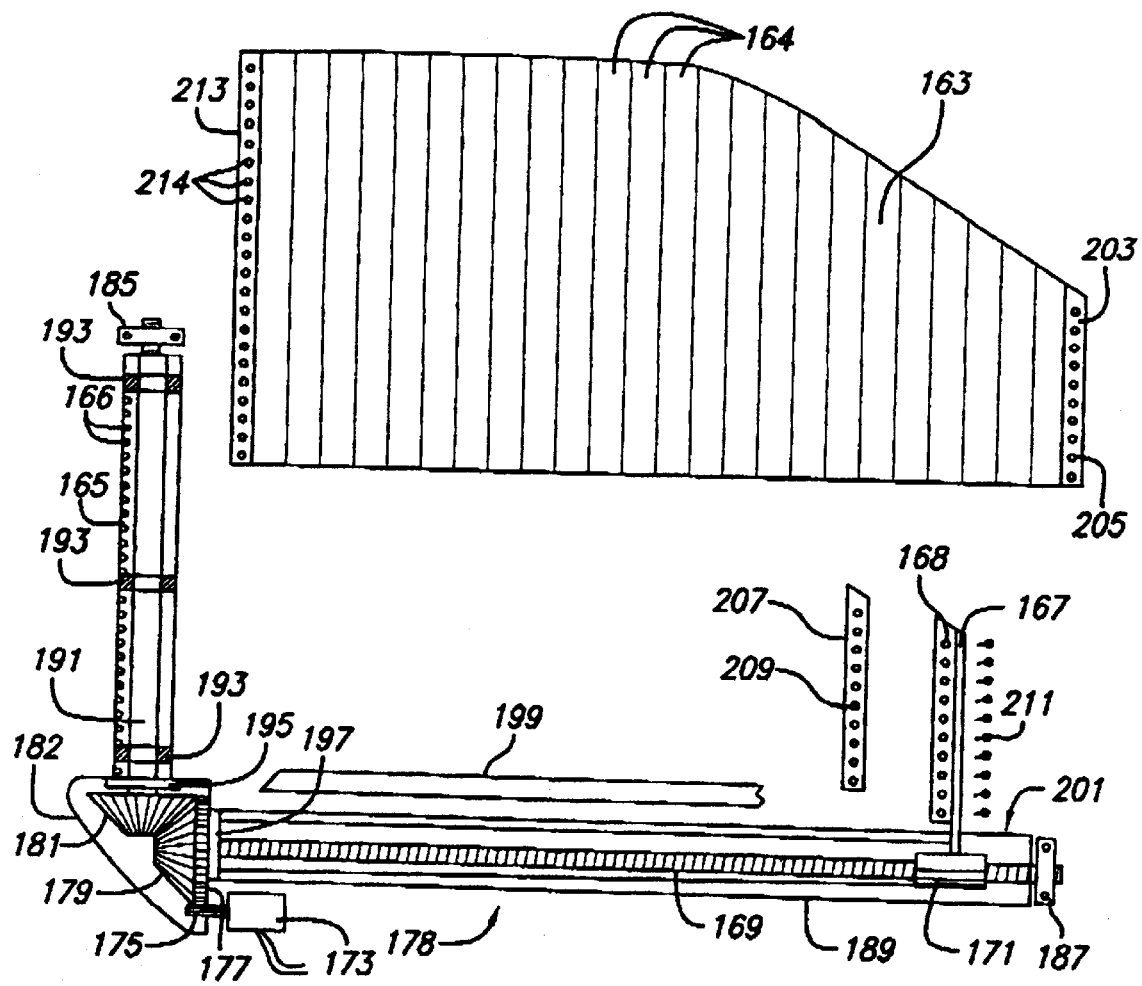
FIG. 26 is an exploded view of the automobile side window shade arrangement shown in FIG. 25, and showing further details of the arrangement.

Pulling blade or bar 167 is rigidly connected at its lowest end to a nut guide 171 which is driven horizontally along screw or threaded shaft 169 as the latter is rotated. Thus, as the shade 163 is wound on shade tube 165, pulling blade or bar 167 moves to the left (as seen in FIG. 26). As the shade 163 is unwound from shade tube 165, pulling blade or bar 167 moves to the right (as seen in FIG. 26). At all times, being driven in either linear direction, the aforementioned pretensioning of the shade horizontally is maintained.

To assist in keeping the bottom of shade 163 in alignment, a smooth U-shaped track 199 may extend the length of the extender-retractor 178 below a long horizontal opening (not shown) in the vehicle door adjacent the window (also not shown). The elongated cover and automatic covering device used in the embodiment of the invention for front or rear window shading is not necessary in a side window application, since the slots in the vertical frame member 183 and horizontal door frame already have openings for the side window, and since the thin shade 163 will lie closely adjacent the window. When the shade is retracted, it can be easily concealed using a thin rubber strip 184 or 164 in the vertical and horizontal frame members of the automobile, respectively.

Figure 27:
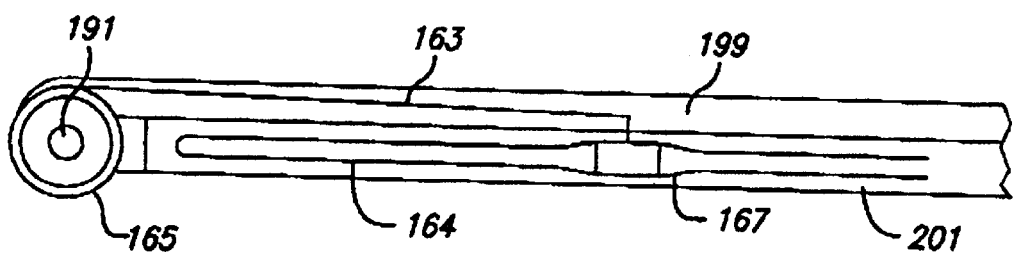
FIG. 27 is top view of the shade and shade connections as would be seen from above the arrangement of FIG. 26, without the drive, extension, and retraction mechanisms.

As best seen in FIG. 27, such a rubber or felt strip may be comprised of a pair of parallel strips 164 contained within the opening 201 for the pulling blade or bar 167. As the pulling blade or bar 167 moves left and right as seen in FIG. 27, the thin flexible rubber or felt strip 164 will tend to close around the pulling blade or bar 167. A similar action of the rubber strip 184 would serve to assist in maintaining a vertical orientation of the shade 163, while at the same time closing together as the shade 163 is retracted to fully be contained within the vertical frame member 183 for full concealment of the shade 163.

Figure 28:
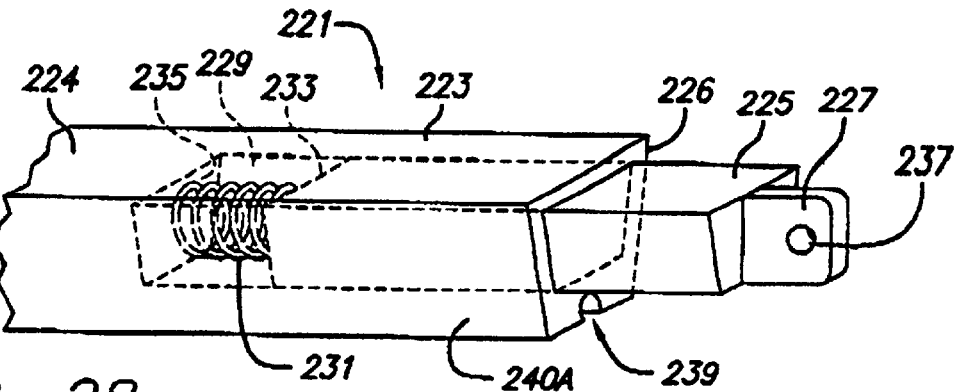
FIG. 28 is a partial perspective view of a variation of a rising bar according to the present invention.

FIGS. 28–31 illustrate an alternative variation of a rising bar arrangement 221 for use with any of the aforedescribed embodiments of an end window (windshield or rear window) shade arrangement for a vehicle. With previously described rising bar variations, a separate automatic mechanism may be provided for covering the elongated opening in, for example, the dash of an automobile when the shade is fully retracted. Using the rising bar arrangement 221 constructed as shown in FIG. 28, no separate cover mechanism is required, and yet the dash opening will be completely covered when the shade is fully retracted, concealing the retracted shade and opening from view.

This feature of the invention is made possible by configuring the elongated opening in the dash to have downwardly converging side walls or converging spaced ribs or straps (not shown), and configuring the cross sectional shape of the rising bar 223 to have a complementary shape, such as the trapezoidal shape shown. The top 224 of the rising bar 223 is preferably finished in color and texture to match the upper surface of the automobile dash. When the rising bar 223 is fully seated, the rising bar top 224 is flush with the upper surface of the dash and blends with it. Thus, with this variation, the covering and rising bar are combined, so that the rising bar itself conceals the elongated opening in the dash.

FIG. 28 shows an example of a rising bar 223 having a trapezoidal cross sectional shape, i.e., having sloping sides 226 and 240A so as to fit nicely with the contour of the elongated dash opening (not shown).

Figure 29:
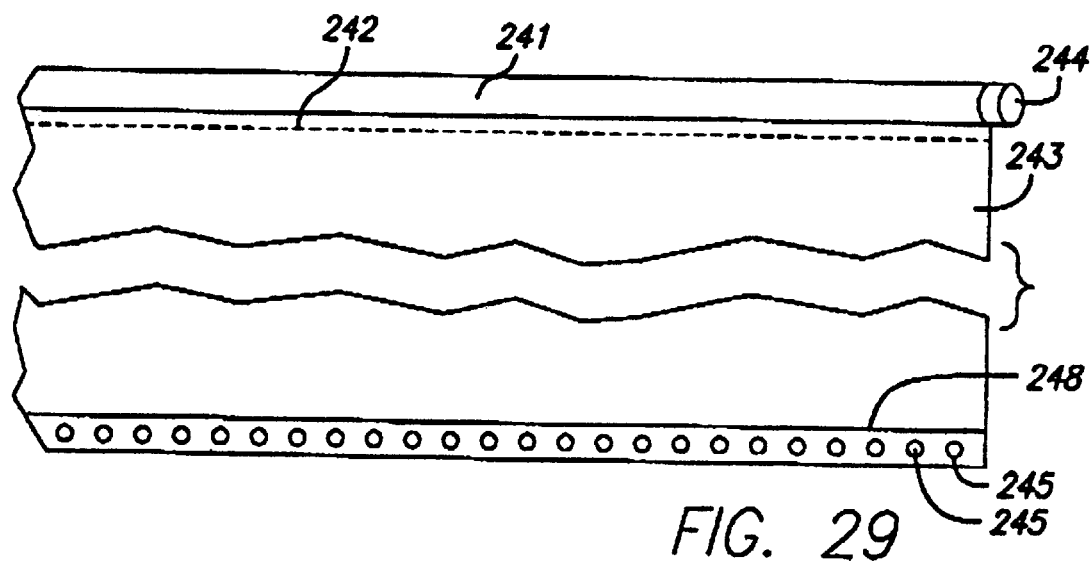
FIG. 29 is a partial side perspective view of an end window shade coupled to a shade support rod.

An elongated groove 239 extends the length of the rising bar 223 along its bottom, the cross section of the groove 239 preferably being circular and having a perimeter greater than 180° and less than 360° in order to securely capture and retain a shade support rod 244 therein. The shade support rod 244 is inserted into a shade hem 241 created by and inseam 242 at the top of the shad 243 as shown in FIG. 29. The groove 239 is large enough to accept the shade covered support rod 244 by sliding the shade covered rod 244 endwise into groove 239. This permits easy replacement of the shade 243 when desired.

At the lower end of the shade 243, the shade material is folded over and sewn along line 248, and a series of holes, or eyelets 245, are punched/placed along the entire length of the bottom of the shade 245. These eyelets 245 will be engaged by a like plurality of hooks on the shade tube upon which it is rolled (cf. FIGS. 5, 8, 8A, and 8B and the associated description).

Returning to FIG. 28, it will be recalled that, for a windshield shade arrangement, the vehicle has left and right elongated side supports (FIG. 1) tilted slightly inward toward each other at the top, indicating that the rising bar arrangement 221 must change its length as the shade 243 is extended and retracted.

To accomplish this, rising bar 223 has a hollow end segment at each of its ends defining end cavities 229, within which a compression spring 231 presses against the proximal end 233 of a plunger 225. The distal end of the plunger 225 is has a tab extension 227 pivotally attached to a short link (not shown, but cf. short link 77A in FIG. 6). The tab extension 227 may be connected similarly to the FIG. 6 arrangement, and details need not be repeated here.

With this arrangement, as the rising bar arrangement 221 is moved up and down, the compression springs 231 compress further as the rising bar arrangement 221 rises and expand as the rising bar arrangement 221 lowers, thereby keeping the end segments of the rising bar arrangement 221 in proper alignment relationship with respect to the sloping left and right elongated side supports.

As with the other rising bar variations described above, appropriate mechanisms are provided in order to pretension the shade 243 between the rising bar 223 and the shade tube upon which it is rolled.

In order to have access to the working parts of the rising bar arrangement 221, instead of an integrally formed front side wall 240A as shown in FIG. 28, such wall may be removable for ease of replacing parts, e.g. spring 231. Toward that end, two possible alternate variations of replaceable side walls for the rising bar 223 are shown in FIGS. 30 and 31.

Figure 30:
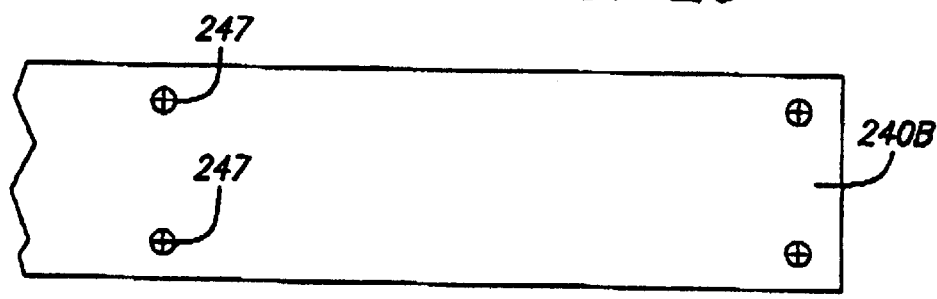
FIG. 30 is a partial outer side view of a side cover for the rising bar of FIG. 28.
Figure 31:
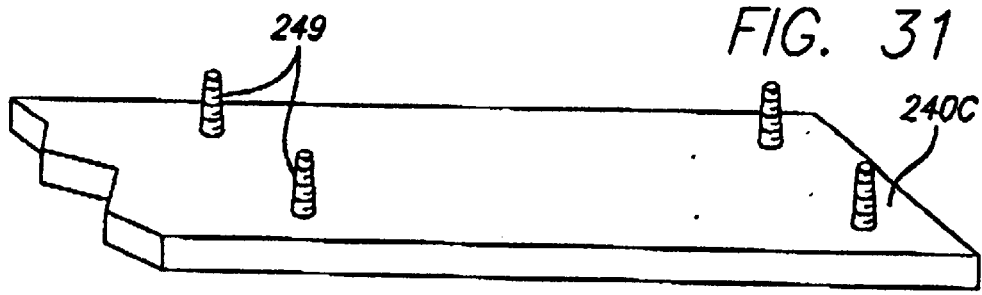
FIG. 31 is a partial inner side view of an alternate variation of a side cover for the rising bar of FIG. 28.

FIG. 30 shows the outer side of a replaceable side wall 240B which is attached to the front side of rising bar 223 in a known manner. Alternatively, FIG. 31 shows the inner side of a replaceable side wall 240C which is made easily removable by providing fasteners, e.g. hooks or split finger buttons, permitting removal and replacement without the use of tools.

It will be understood that the configuration of the rising bar arrangement 221 is exemplary only, and other geometries than trapezoidal may be chosen. For example, the cross section may be "T" shaped, whereby the plunger 225 would likewise be "T" shaped. Any geometrical configuration may be selected, for so long as the elongated opening in the dash will accept it in a snug fit to prevent rattling and for proper alignment of the top 224 with the dash upper surface.

While only certain embodiments of the invention have been set forth above, alternative embodiments and various modifications will be apparent from the above description and the accompanying drawing to those skilled in the art.

For example, the window shade arrangements shown and described herein can be installed to be completely automatic—they can be engaged or disengaged by using the ignition key, a remote control, or an independent switch arrangement for each individual window. This feature can be seen as related to the power lock switch in modern day vehicles.

For security purposes, mechanical or electro-mechanical arrangements may be provided in order that the window shade arrangement cannot be engaged while the vehicle is in motion and/or when the windows are open.

In any application to shade vehicle windows, the same type of concealment measures as described herein may be employed so that the mechanisms are completely concealed from view when the shade is retracted.

Although it is possible to install the vehicle window shade arrangement according to the present invention as an after market product, it is proposed that the invention be installed in new vehicles to reduce bulk, to streamline the mechanical design, to enhance the complete concealment of a retracted window shade, and to simplify the electrical wiring and switch/remote-control considerations.

The aforementioned and other alternatives and improvements are considered to be achievable by a person of ordinary skill in the art to which the invention pertains and/or are considered as equivalents and within the spirit and scope of the present invention.

What is claimed is:

1. A vehicle end window shade arrangement for at least partially shading an end window of a vehicle having a generally horizontal surface below the end window and an elongated opening in the surface extending along the width of the end window, said end window shade arrangement comprising:

a shade tube rotatably mounted below the generally horizontal surface;

a shade rolled about said shade tube, said shade having a connected end attached to said shade tube and an opposite end;

a shade extender-retractor coupled to said shade opposite end for selectively unrolling said shade from said shade tube to an extended position at least partially shading the end window, and rolling said shade about said shade tube to a retracted position not shading the end window; and left and right elongated side supports disposed adjacent left and right sides, respectively, of the end window, said shade being supported by said left and right side supports when not retracted, said supports adapted to keep said shade in constant tension independent of the position of said shade.

2. The vehicle end window shade arrangement as claimed in claim 1, wherein said shade extender-retractor comprises a constant tension mechanism for maintaining a substantially constant pretension on said shade relative to said shade tube at all positions of said shade between fully extended and fully retracted.

3. The vehicle end window shade arrangement as claimed in claim 1, wherein said shade extender-retractor comprises a rising bar extending between said side supports, said opposite end of said shade being supported along said rising bar.

4. The vehicle end window shade arrangement as claimed in claim 1, wherein:

said shade extender-retractor comprises a drive arrangement for driving said shade to said extended and retracted positions.

5. The vehicle end window shade arrangement as claimed in claim 4, wherein:

said drive arrangement comprises a manual drive assembly for manually driving said shade to said extended and retracted positions.

6. The vehicle end window shade arrangement as claimed in claim 4, wherein:

said drive arrangement comprises a powered drive assembly for driving said shade to said extended and retracted positions under electro-mechanical power.

7. The vehicle end window shade arrangement as claimed in claim 4, wherein:

said drive arrangement comprises an electric motor and a switch, said switch connected to said electric motor and having a first switch position and a second switch position; and said motor drives said shade toward said extended position when said switch is in said first position, and said motor drives said shade toward said retracted position when said switch is in said second position.

8. The vehicle end window shade arrangement as claimed in claim 4, wherein said drive arrangement comprises:

an upper pulley rotatably mounted to each said side support;

a lower pulley rotatably mounted beneath each said upper pulley and beneath the generally horizontal surface;

a drive belt looped around each pair of said upper and lower pulley pair; and an electric motor coupled to said drive belt for moving a segment of each said drive belt in either direction along the length of its corresponding side support, said opposite end of said shade coupled to said belt segment.

9. The vehicle end window shade arrangement as claimed in claim 8, wherein:

said drive arrangement comprises a tensioning member associated with each said drive belt to maintain said drive belts in tension constant at all times.

10. The vehicle end window shade arrangement as claimed in claim 1, comprising:

a tensioning member associated with at least one of said side supports to effect a pretension on said shade relative to said shade tube and to maintain substantially constant pretension on said shade at all positions of said shade.

11. The vehicle end window shade arrangement as claimed in claim 3, wherein:
    each said side support has an elongated slot therein along its length; and
    said rising bar has left and right end segments which extend into corresponding ones of said elongated slots when said shade is extended.

12. The vehicle end window shade arrangement as claimed in claim 8, wherein:
    each said drive belt comprises internal corrugations; and
    at least said lower pulleys have external corrugations complementarily matching said internal corrugations of said drive belts to maintain an indexed positional relationship between said pulleys and said belt.

13. The vehicle end window shade arrangement as claimed in claim 4, wherein said drive arrangement comprises:
    an upper pulley rotatably mounted to each said side support;
    a lower pulley rotatably mounted beneath each said upper pulley and beneath the generally horizontal surface;
    a flexible drive cord looped around each pair of said upper and lower pulley pair; and
    an electric motor coupled to said flexible drive cord for moving a segment of each said flexible drive cord in either direction along the length of its corresponding side support, said opposite end of said shade coupled to said flexible drive cord segment.

14. The vehicle end window shade arrangement as claimed in claim 13, wherein:
    said drive arrangement comprises a tensioning member associated with each said drive cord to maintain said drive cords in tension at all times.

15. The vehicle end window shade arrangement as claimed in claim 13, wherein:
    each said drive cord is keyed to one of said pulleys to maintain an indexed positional relationship between said pulleys and said cord segments.

16. The vehicle end window shade arrangement as claimed in claim 4, wherein said drive arrangement comprises:
    an elongated threaded shaft rotatably mounted within each said side support;
    a guide nut threaded onto each said threaded shaft and movable linearly along said shaft as said shaft rotates;
    an electric motor and transmission coupled to said threaded shafts for rotating said threaded shafts and effecting linear movement of each said guide nut in either direction along the length of its corresponding side support, said opposite end of said shade coupled to said guide nut.

17. The vehicle end window shade arrangement as claimed in claim 1 for use in a vehicle having a dash, wherein:
    said end window is a windshield; and
    said generally horizontal surface is the dash of the vehicle.

18. The vehicle end window shade arrangement as claimed in claim 1 for use in a vehicle having a rear deck below the vehicle rear window, wherein:
    said end window is a rear window of the vehicle; and
    said generally horizontal surface is a the rear deck below the vehicle rear window.

19. A vehicle end window shade arrangement for at least partially shading an end window of a vehicle having a generally horizontal surface below said end window and an elongated opening in the surface extending along the width of the end window, said end window shade arrangement comprising:
    a shade tube rotatably mounted below the generally horizontal surface;
    a shade rolled about said shade tube, said shade having a connected end attached to said shade tube and an opposite end;
    a shade extender-retractor coupled to said shade opposite end for selectively unrolling said shade from said shade tube to an extended position at least partially shading the end window, and rolling said shade about said shade tube to a retracted position not shading the end window;
    an elongated cover adapted to selectively cover and uncover said elongated opening in the generally horizontal surface; and
    an automatic actuator for manipulating said cover to automatically cover said elongated opening when said window shade is at its retracted position, and to automatically uncover said elongated opening when said window shade is at an extended position.

20. The vehicle end window shade arrangement as claimed in claim 19, wherein said elongated cover is hinged relative to said generally horizontal surface and has a top surface which is positioned flush with the generally horizontal surface when said shade is in said retracted position.

21. The vehicle end window shade arrangement as claimed in claim 18, wherein:
    said shade comprises a rising bar attached to the top distal end of said shade;
    said cover is hinged to the generally horizontal surface;
    said automatic actuator comprises a biasing member biasing said cover to its uncovered position; and
    said automatic actuator further comprises an actuator member moveable upon engagement by said rising bar to overcome the biasing force of said biasing member to automatically close said cover when said rising bar engages said actuator member.

22. The vehicle end window shade arrangement as claimed in claim 19 for use in a vehicle having a dash, wherein:
    said end window is a windshield; and
    said generally horizontal surface is the dash of the vehicle.

23. The vehicle end window shade arrangement as claimed in claim 19 for use in a vehicle having a rear deck below the vehicle rear window, wherein:
    said end window is a rear window of the vehicle; and
    said generally horizontal surface is a the rear deck below the vehicle rear window.

24. A vehicle end window shade arrangement for at least partially shading an end window of a vehicle having a generally horizontal surface below said end window and an elongated opening in the generally horizontal surface extending along the width of the end window, said window shade arrangement comprising:
    a shade having a first end and an opposite second end, said shade extendable to shade the end window and retractable for storage and concealment below said generally horizontal surface;
    a shade extender-retractor coupled to said shade for selectively extending said shade to an extended position at least partially shading the end window, and retracting said shade to a retracted position not shading the end window; and a constant tension mechanism for maintaining a substantially constant pretension on said shade at all positions of said shade between fully extended and fully retracted.

25. The vehicle end window shade arrangement as claimed in claim 24 for use in a vehicle having a dash, wherein:

said end window is a windshield; and said generally horizontal surface is the dash of the vehicle.

26. The vehicle end window shade arrangement as claimed in claim 24 for use in a vehicle having a rear deck below the vehicle rear window, wherein:

said end window is a rear window of the vehicle; and said generally horizontal surface is a the rear deck below the vehicle rear window.

27. A vehicle side window shade arrangement for at least partially shading a side window of a vehicle having a vertical frame member with an elongated opening therein extending along the height of the side window, said side window shade arrangement comprising:

a shade tube rotatably mounted in the vertical frame member;

a shade rolled about said shade tube, said shade having a connected end attached to said shade tube and an opposite end; and a shade extender-retractor coupled to said shade opposite end for selectively unrolling said shade from said shade tube to an extended position at least partially shading the side window, and rolling said shade about said shade tube to a retracted position in which said shade is stored and concealed within the vertical frame member and not shading the side window.

28. The vehicle side window shade arrangement as claimed in claim 27, comprising a constant tension mechanism for maintaining a substantially constant pretension on said shade relative to said shade tube at all positions of said shade between fully extended and fully retracted.

29. The vehicle side window shade arrangement as claimed in claim 27, wherein:

said shade extender-retractor comprises a horizontally translatable pulling bar extending vertically and attached to said opposite end of said shade, said pulling bar supporting said shade in a vertical orientation and in horizontal tension.

30. The vehicle side window shade arrangement as claimed in claim 27, wherein:

said shade extender-retractor comprises a drive arrangement for driving said shade to said extended and retracted positions.

31. The vehicle side window shade arrangement as claimed in claim 30, wherein:

said drive arrangement comprises a manual drive assembly for manually driving said shade to said extended and retracted positions.

32. The vehicle side window shade arrangement as claimed in claim 30, wherein:

said drive arrangement comprises a powered drive assembly for driving said shade to said extended and retracted positions under electro-mechanical power.

33. The vehicle side window shade arrangement as claimed in claim 30, wherein:

said drive arrangement comprises an electric motor and a switch, said switch connected to said electric motor and having a first switch position and a second switch position; and said motor drives said shade toward said extended position when said switch is in said first position, and said motor drives said shade toward said retracted position when said switch is in said second position.

34. The vehicle side window shade arrangement as claimed in claim 29, wherein:

said vertical frame member has an elongated slot therein along its length; and said shade and said pulling bar extend into said elongated slot when said shade is retracted.

35. The vehicle side window shade arrangement as claimed in claim 30, wherein said drive arrangement comprises:

an elongated threaded shaft rotatably mounted within said shade extender-retractor;

a guide nut threaded onto said threaded shaft and movable linearly along said shaft as said shaft rotates;

an electric motor and transmission coupled to said threaded shaft for rotating said threaded shaft and effecting linear movement of said guide nut in either direction along the length of said shade extender-retractor, said opposite end of said shade being coupled to said guide nut.

36. A side window shade arrangement for at least partially shading a side window of a vehicle having a vertical frame member with an elongated opening therein extending along the height of the side window, said side window shade arrangement comprising:

a shade having a first end and an opposite second end, said shade extendable to shade the side window and retractable for storage and concealment within said vertical frame member; and a shade extender-retractor coupled to said shade for selectively extending said shade to an extended position at least partially shading the side window, and retracting said shade to a retracted position not shading the side window.

37. A vehicle end window shade arrangement for at least partially shading an end window of a vehicle having a generally horizontal surface below the end window and an elongated opening in the surface extending along the width of the end window, said end window shade arrangement comprising:

a shade tube rotatably mounted below the generally horizontal surface;

a shade rolled about said shade tube, said shade having a connected end attached to said shade tube and an opposite movable end;

a rising bar attached to said opposite movable end of said shade, said rising bar having a top blending with the generally horizontal surface when covering the elongated opening in said generally horizontal surface; and a shade extender-retractor coupled to said rising bar for selectively unrolling said shade from said shade tube to an extended position at least partially shading the end window, and rolling said shade about said shade tube to a retracted position not shading the end window, said rising bar top covering the elongated opening in said retracted position of said shade.

38. The vehicle end window shade arrangement as claimed in claim 37, comprising a constant tension mechanism for maintaining a substantially constant pretension on said shade relative to said shade tube at all positions of said shade between fully extended and fully retracted.

39. The vehicle end window shade arrangement as claimed in claim 37, comprising:

left and right elongated side supports disposed adjacent left and right sides, respectively, of the end window, said shade being supported by said left and right side supports when not retracted; and wherein said rising bar extends between said side supports.

40. The vehicle end window shade arrangement as claimed in claim 37, wherein:

said shade extender-retractor comprises a drive arrangement for driving said shade to said extended and retracted positions.

41. The vehicle end window shade arrangement as claimed in claim 39, wherein:

each said side support has an elongated slot therein along its length; and said rising bar has left and right end segments which extend into corresponding ones of said elongated slots when said shade is extended.

42. The vehicle end window shade arrangement as claimed in claim 37, comprising a shade support rod to which the movable end of said shade is coupled, and wherein:

said rising bar has a bottom and a longitudinal groove in said bottom; and said shade support rod is removably insertable in said longitudinal groove to expedite shade removal and replacement.

43. The vehicle end window shade arrangement as claimed in claim 37, wherein:

said rising bar comprises a removable cover covering a longitudinal side of said rising bar.

* * * * *